United States Patent [19]
Miyazaki et al.

[11] Patent Number: 5,548,577
[45] Date of Patent: Aug. 20, 1996

[54] DISC CARTRIDGE

[75] Inventors: Benichi Miyazaki, Katano; Yukio Nishino, Ikoma-gun; Kanji Wakabayashi, Kyoto, all of Japan

[73] Assignee: Matsushita Electric Industrial Co., Ltd., Osaka-fu, Japan

[21] Appl. No.: 331,880

[22] Filed: Nov. 1, 1994

Related U.S. Application Data

[63] Continuation of Ser. No. 987,221, Dec. 8, 1992, abandoned.

[30] Foreign Application Priority Data

Dec. 9, 1991 [JP] Japan .................................. 3-324422
Jun. 25, 1992 [JP] Japan .................................. 4-167173

[51] Int. Cl.⁶ .................................................. G11B 23/02
[52] U.S. Cl. .................................................. 369/291
[58] Field of Search .......................... 369/291; 360/133

[56] References Cited

U.S. PATENT DOCUMENTS

| | | | |
|---|---|---|---|
| 4,488,190 | 12/1984 | Oishi et al. | 360/133 |
| 4,511,944 | 4/1985 | Saito | 360/133 |
| 4,639,813 | 1/1987 | Und | 360/133 |
| 4,665,457 | 5/1987 | Odawara et al. | 360/133 |
| 4,793,480 | 12/1988 | Gelardi et al. | 360/133 |
| 4,858,050 | 8/1989 | Ashe et al. | 360/133 |
| 4,945,530 | 7/1990 | Sandell et al. | 369/291 |
| 5,150,354 | 9/1992 | Iwata et al. | 369/291 |

FOREIGN PATENT DOCUMENTS

| | | | |
|---|---|---|---|
| 0142099 | 5/1985 | European Pat. Off. | |
| 2584225 | 1/1987 | France | 369/291 |
| 2590395 | 5/1987 | France | 369/72 |
| 59-215086 | 12/1984 | Japan | |
| 60-98578 | 6/1985 | Japan | |

Primary Examiner—Stuart S. Levy
Assistant Examiner—George J. Letscher
Attorney, Agent, or Firm—Wenderoth, Lind & Ponack

[57] ABSTRACT

A disc cartridge for rotatably accommodating an information carrier disc, which includes a first casing having a first cavity defined therein for accommodating a portion of the information carrier disc, and a second casing having a second cavity defined therein for accommodating a remaining portion of the information carrier disc and operatively coupled with the first casing for movement relative to the first casing between extended and retracted positions to bring the disc cartridge into opened and closed positions, respectively. Springs are provided for urging the second casing to the first position. When the second casing is moved against the springs, the disc cartridge is brought to the opened position, allowing one or more access openings to be exposed to the outside of the disc cartridge. A disc retainer is also provided for avoiding any arbitrary motion of the information carrier disc within a disc chamber defined by the first and second cavities in the first and second casings.

9 Claims, 15 Drawing Sheets

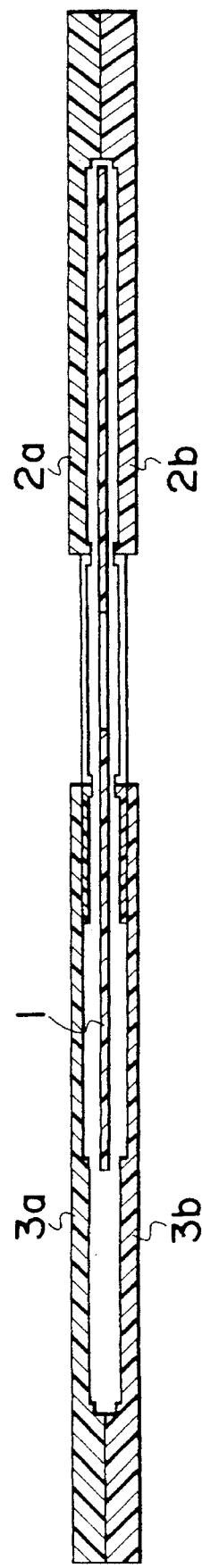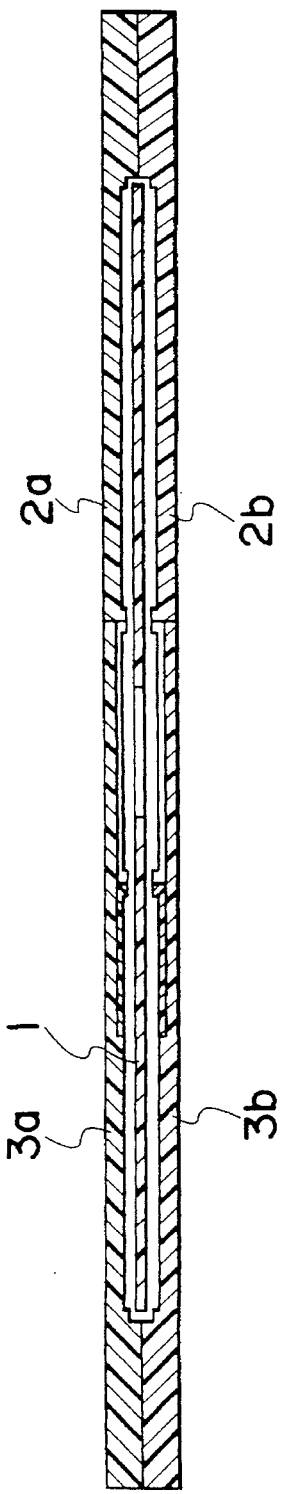

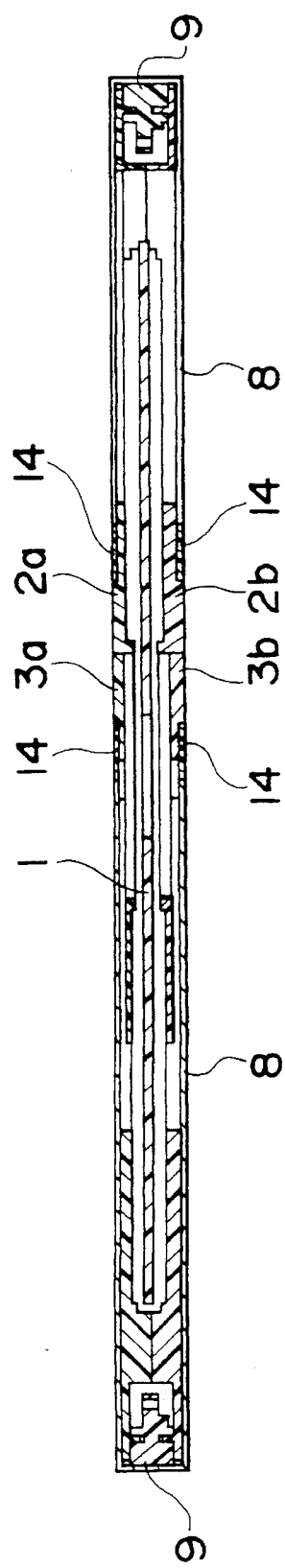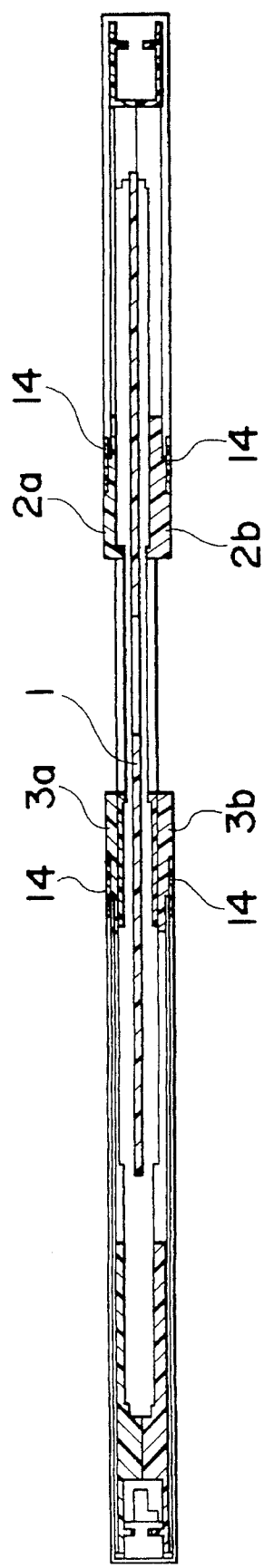

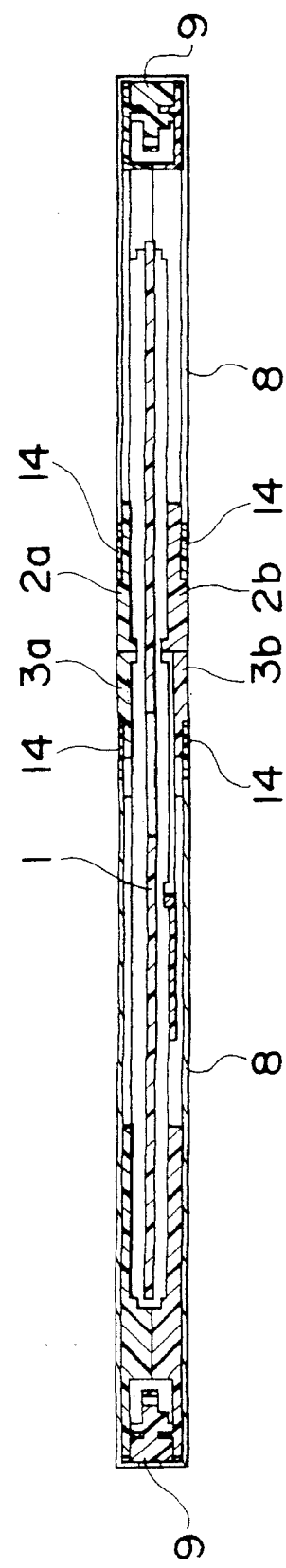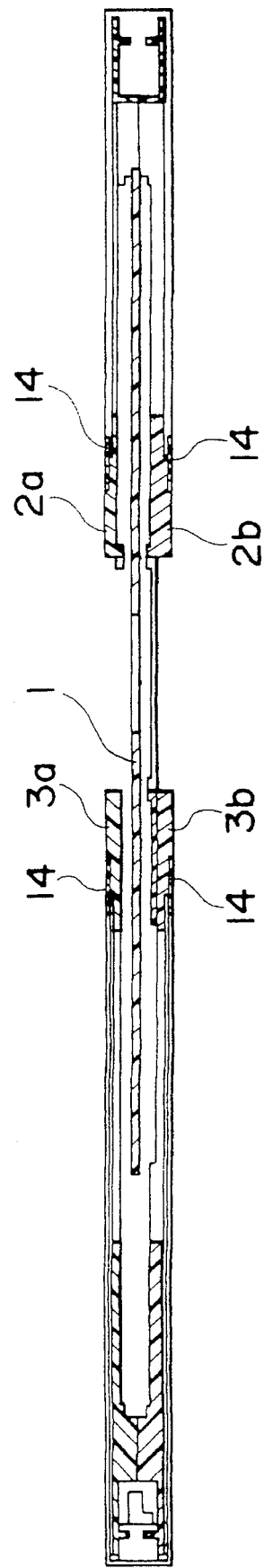

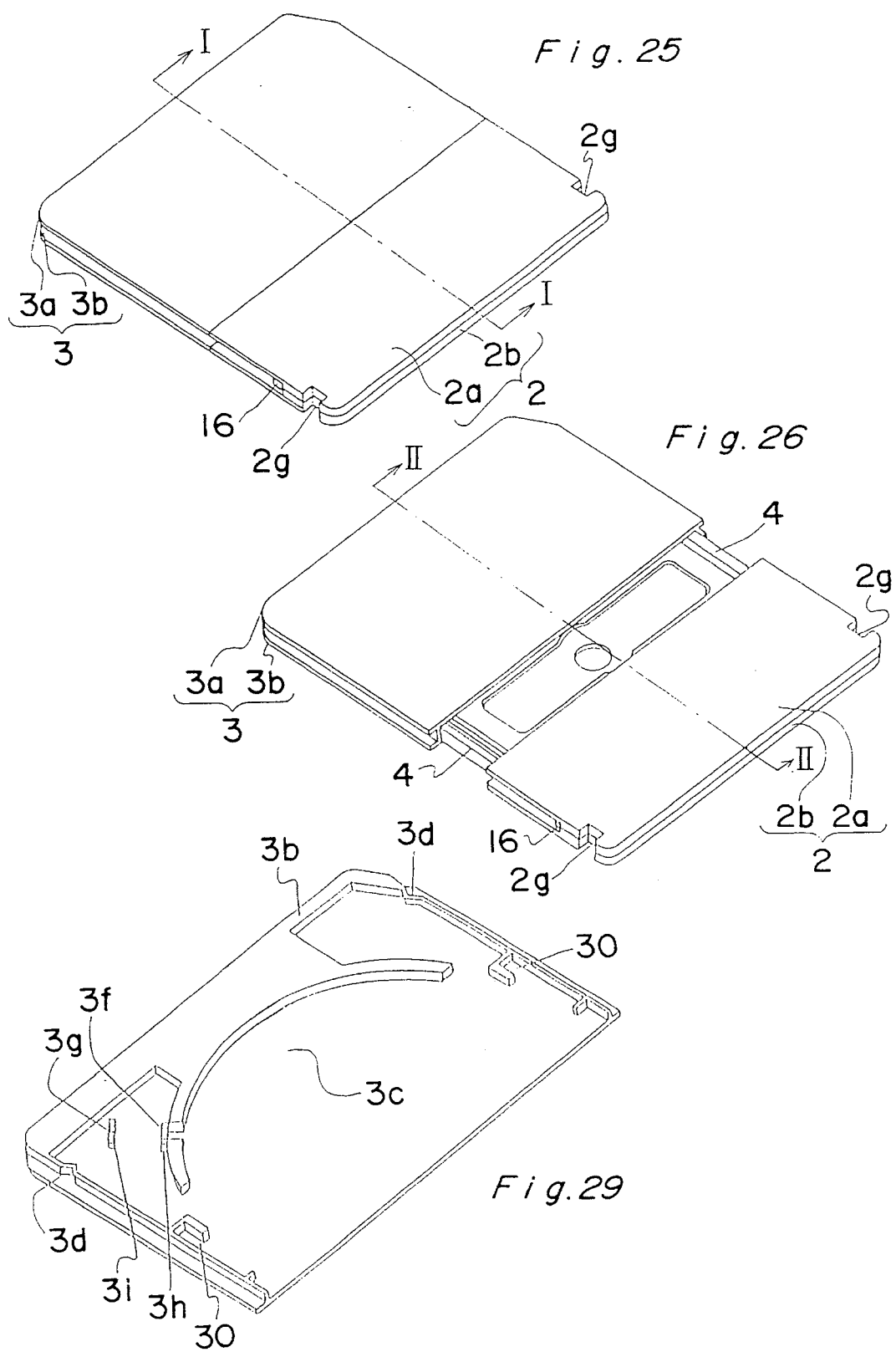

DISC CARTRIDGE

This application is a continuation of now abandoned application, Ser. No. 07/987,221, filed Dec. 8, 1992.

BACKGROUND OF THE INVENTION

1. Field of the Invention

The present invention generally relates to a disc cartridge for use in an information read/write apparatus and, more particularly, to the disc cartridge particularly suited for use in an information read/write apparatus of a type employing a plurality of recording and/or reproducing heads.

2. Description of the Prior Art

As is well known to those skilled in the art, an information carrier disc such as, for example, an optical disc, is accommodated within a generally rectangular disc cartridge not only for protecting the information carrier disc from being contaminated by finger prints and/or dust, but also for improving an operativeness of the information read/write apparatus.

For example, Japanese Laid-open Patent Publication No. 60-98578, published Jun. 1, 1985, discloses a generally rectangular flat disc cartridge accommodating therein a round information carrier disc. This prior art disc cartridge is so designed and so structured that the user of the apparatus need not remove the information carrier disc from the disc cartridge in readiness for a loading thereof into the information read/write apparatus, remove the empty disc cartridge after the loading and insert the empty disc cartridge in readiness for a recovery of the information carrier disc from the information read/write apparatus after an information recording or reading has been completed.

The prior art disc cartridge referred to above has a width in a direction perpendicular to the direction of insertion or removal of the disc cartridge into or from the information read/write apparatus, which is somewhat smaller than the length thereof in a direction perpendicular to the widthwise direction thereby to avoid an incorrect insertion of the disc cartridge into the information read/write apparatus. This disc cartridge comprises front and rear casings defined by splitting the disc cartridge across the width thereof at a position generally intermediate of the length thereof, the front casing being adapted to move a first predetermined distance relative to the rear casing in the lengthwise direction of the disc cartridge. Generally elongate stationary and movable support members are provided on each side of the information carrier disc within the disc cartridge and along each of opposite side walls thereof. Only the movable support members on the respective sides of the information carrier disc are movable a second predetermined distance, which is half the first predetermined distance, in a direction conforming to the lengthwise direction of the disc cartridge.

The elongate movable support members while the front and rear casings are closed together cooperate to support the information carrier disc in a fixed position within the disc cartridge. However, when the front and rear casings are separated from each other by moving the front casing relative to the rear casing over the first predetermined distance leaving an access opening therebetween, the elongate movable support members are moved the second predetermined distance relative to the stationary support members within the rear casing, allowing the information carrier disc in position ready to be rotated for an information reading or writing operation.

When in use in the information read/write apparatus, the disc cartridge in a closed position is inserted into or ejected from a cartridge receiving mouth of the apparatus. The information read/write apparatus must have a cartridge loading and unloading mechanism installed therein. The cartridge loading and unloading mechanism includes two parallel rows of paired roller elements grouped for each of the front and rear casings. Although first and second groups of the paired roller elements are driven at the same speed up until the disc cartridge in the closed position is completely inserted into a cartridge receiving mouth in the apparatus, the first group of the paired roller elements are held still while the second group of the paired roller elements are allowed to continue rotation so that the rear casing within the cartridge receiving mouth can further be moved relative to the front casing to form the access opening between the front and rear casings with the disc cartridge consequently held in an open position.

The access opening between the front and rear casings is of a size corresponding to a turntable or a chuck assembly by which the information carrier disc can be clamped for rotation together with a motor-coupled spindle. The movement of the paired movable support members over the second predetermined distance, i.e., half the first predetermined distance, is necessary to bring a center hole of the information carrier disc into alignment with the longitudinal axis of the motor-coupled spindle and at a position generally exactly intermediate of the spacing of the access opening.

As discussed above, the prior art disc cartridge is complicated in structure employing such a substantial number of component parts as to adversely affect the reliability of operation of the disc cartridge and, at the same time, requires the information read/write apparatus to be equipped with a complicated cartridge loading and unloading mechanism.

SUMMARY OF THE INVENTION

The present invention has been devised for the purpose of substantially eliminating the above-discussed problems inherent in the prior art disc cartridge and is intended to provide an improved disc cartridge of a type, simple in structure and reliable in operation, employing a minimized number of movable component parts.

To this end, the present invention provides a disc cartridge for rotatably accommodating an information carrier disc, which comprises a first casing having a first cavity defined therein for accommodating a portion of the information carrier disc, and a second casing having a second cavity defined therein for accommodating a remaining portion of the information carrier disc and operatively coupled with said first casing for movement relative to the first casing between extended and retracted positions to bring the disc cartridge into opened and closed positions, respectively. At least one of said first and second casings has an access opening defined therein for allowing of a turntable and at least one head, both provided in an information read/write apparatus, to access the information carrier disc. The access opening is exposed to the outside when the second casing is moved to the extended position relative to the first casing.

Preferably, at least one shutter is provided in one of the first and second casing for selectively opening and closing the access opening. In such case, the shutter is operatively coupled so that the shutter opens the access opening in response to the movement of one of the casings to the extended position relative to the other of the casings.

Preferably, the disc cartridge has a disc retainer for avoiding any arbitrary motion of the information carrier disc within a disc chamber defined by the first and second cavities.

Also, preferably, a locking means is provided on one of the first and second casings, and comprises a lock pawl means pivotally mounted inside the other of the first and second casings and engageable with a guide means for guiding the second casing during its movement relative to the first casing, a biasing means for urging the lock pawl means towards the guide means, and a lock release means having a portion exposed to the outside of the cavity in the other of the first and second casings and operable to press the lock pawl means.

According to the present invention, since the first and second casings are separable from each other, the number of movable component parts is minimized and the cartridge loading and unloading mechanism provided in the information read/write apparatus suffices to have, for example, pawls as stoppers in order for the disc cartridge to be properly positioned inside the cartridge loading and unloading mechanism and also to be brought into the opened position, providing the disc cartridge with a simplified structure and a high reliability.

The selective opening and closing of the shutter is operatively associated with the movement of one of the casings relative to the other of the casing and, therefore, no shutter opening and closing mechanism is necessary in the information read/write apparatus.

Moreover, since the disc retainer disengages from the information carrier disc in response to the movement of one of the casings to the extended position relative to the other of the casings, the information read/write apparatus is not required to have a release mechanism for releasing the disc retainer, making it possible to manufacture it in a simplified manner.

Furthermore, the first and second casings are lockable together by means of the locking means and, therefore, there is no possibility that the user may accidentally touch the information carrier disc.

BRIEF DESCRIPTION OF THE DRAWINGS

These and other objects and features of the present invention will become clear from the following description taken in conjunction with preferred embodiments thereof with reference to the accompanying drawings, in which:

FIGS. 6 and 7 are cross-sectional views of the disc cartridge taken along the lines I—I and II—II shown in FIGS. 4 and 5, respectively;

FIGS. 13 and 14 are cross-sectional views of the disc cartridge taken along the lines I—I and II—II shown in FIGS. 11 and 12, respectively;

FIGS. 20 and 21 are cross-sectional views of the disc cartridge taken along the lines I—I and II—II shown in FIGS. 18 and 19;

FIGS. 22 to 26 are views similar to FIGS. 1 to 5, respectively, showing a fourth preferred embodiment of the present invention;

FIG. 29 is a perspective view of the casing half of a modified form of the fourth embodiment of the disc cartridge, with the corresponding upper panel

DETAILED DESCRIPTION OF THE PREFERRED EMBODIMENTS

Figure 1:
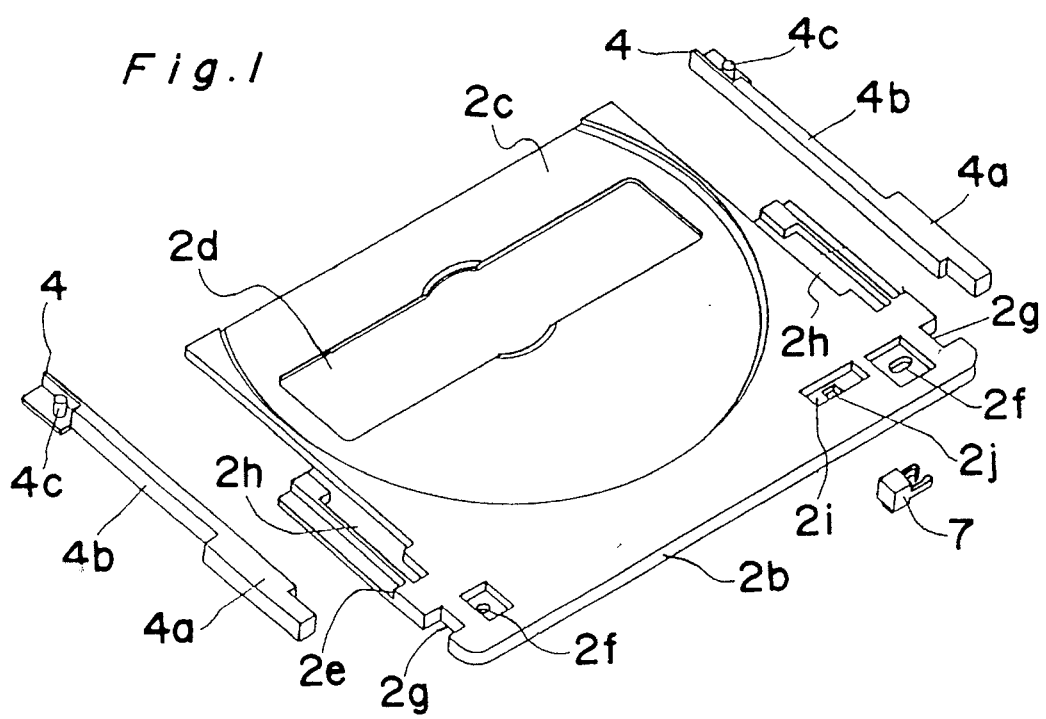
FIG. 1 is an exploded view of one of casing halves of a first preferred embodiment of a disc cartridge according to the present invention, with upper panels of the respective casing halves removed.
Figure 2:
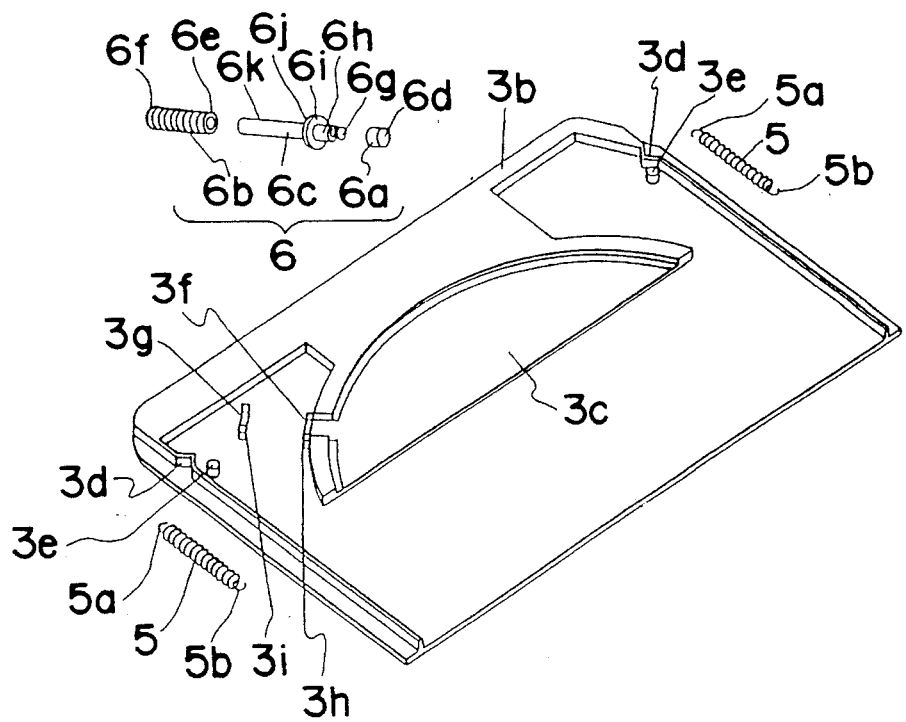
FIG. 2 is an exploded view of the other of the casing halves of the first preferred embodiment of the disc cartridge according to the present invention, with the upper panels of the respective casing halves removed.
Figure 3:
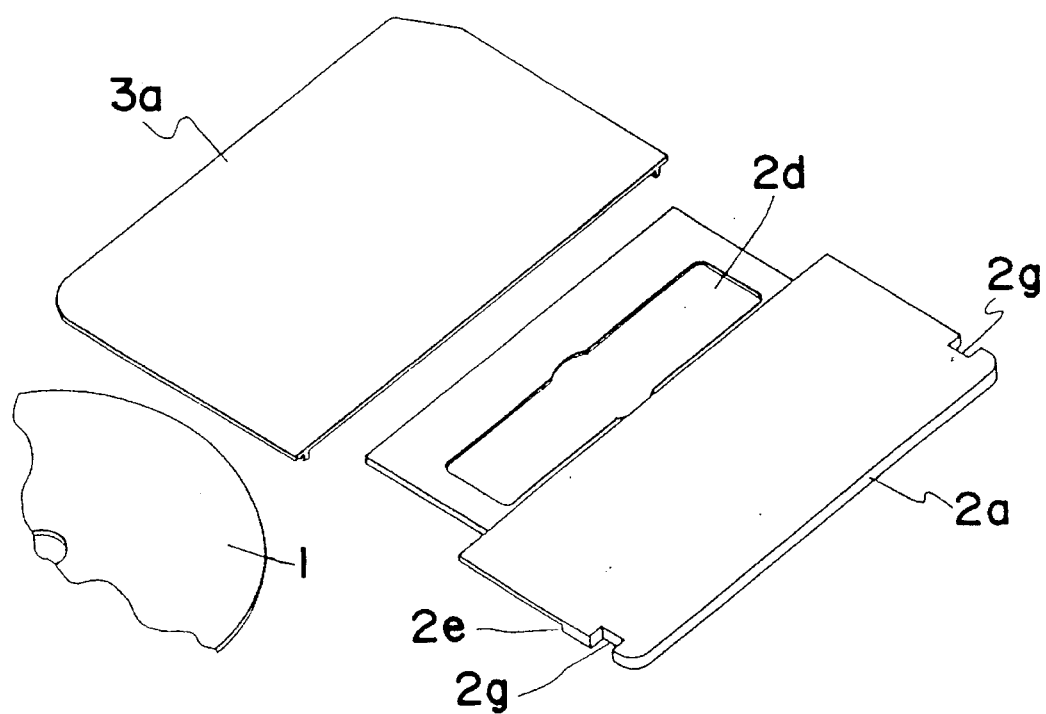
FIG. 3 is an exploded view, on a reduced scale, of the first preferred embodiment of the disc cartridge according to the present invention, showing the upper panels of the respective casing halves.

It is to be noted that in all of the accompanying drawings, a cartridge loading and unloading mechanism of the information read/write apparatus with which the disc cartridge of the present invention operates is not shown for the sake of brevity, but will be briefly described in terms of its function in association with the disc cartridge of the present invention to an extent necessary to understand the operation of the disc cartridge.

First Embodiment (FIGS. 1 to 7)

Referring now to FIGS. 1 to 7, a generally rectangular flat disc cartridge has a width in a direction perpendicular to the direction of selective insertion or removal of the disc cartridge into or from the information read/write apparatus and also has a length in a direction conforming to the direction of selective insertion or removal of the disc cartridge and perpendicular to the widthwise direction thereof. The direction of selective insertion or removal of the disc cartridge is shown by the arrow X in FIG. 5. The disc cartridge contains therein a single-sided or double-sided information carrier disc 1 generally loosely accommodated therein for rotation about its center and comprises first and second casings 2 and 3 operatively coupled together and supported for movement relative to each other to selectively bring the disc cartridge into opened and closed positions. Each of the first and second casings 2 and 3 is made of a relatively hard synthetic resin such as, for example, ABS resin.

The first casing 2 is oversized relative to the second casing 3 meaning that the overall length of the casing 2 in the insertion/removal direction is greater than the overall length of the casing 3 in the insertion/removal direction comprises generally rectangular upper and lower panels 2a and 2b of similar shape assembled together by the use of set screws or by the use of any known fusion-bonding technique while leaving a first cavity 2c defined therein for accommodating a part of the information carrier disc 1. This first cavity 2c has the shape of one segment of a circle, but is larger than a semicircle so that a corresponding major portion of the round information carrier disc 1 can be accommodated therein. This cavity 2c is delimited by a first arcuate side wall surface 2' and a first disk holding segment 2" of the first casing 2.

Figure 4:
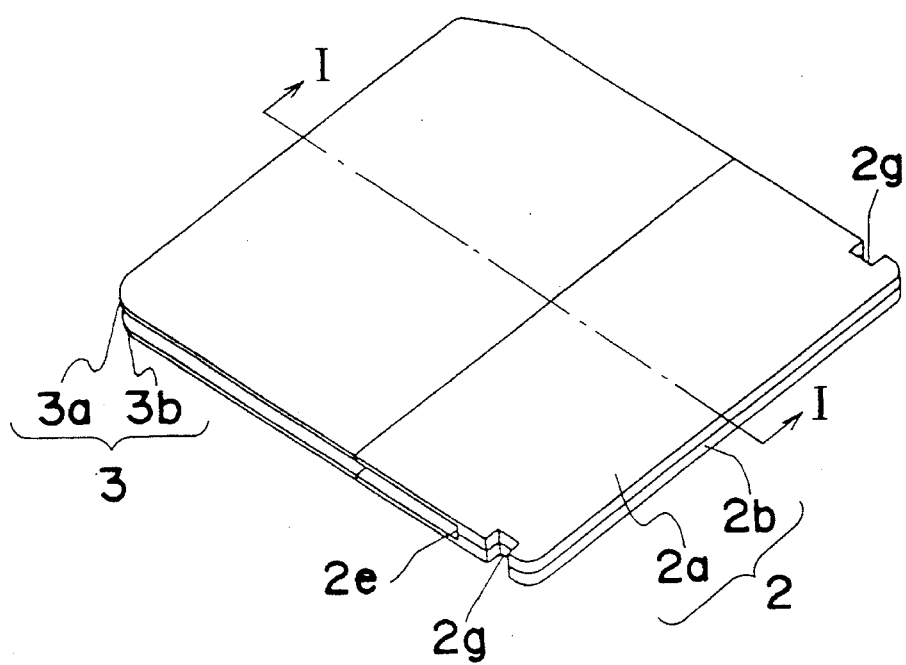
FIG. 4 is a perspective view of the first preferred embodiment of the disc cartridge according to the present invention showing the disc cartridge in a closed position.
Figure 5:
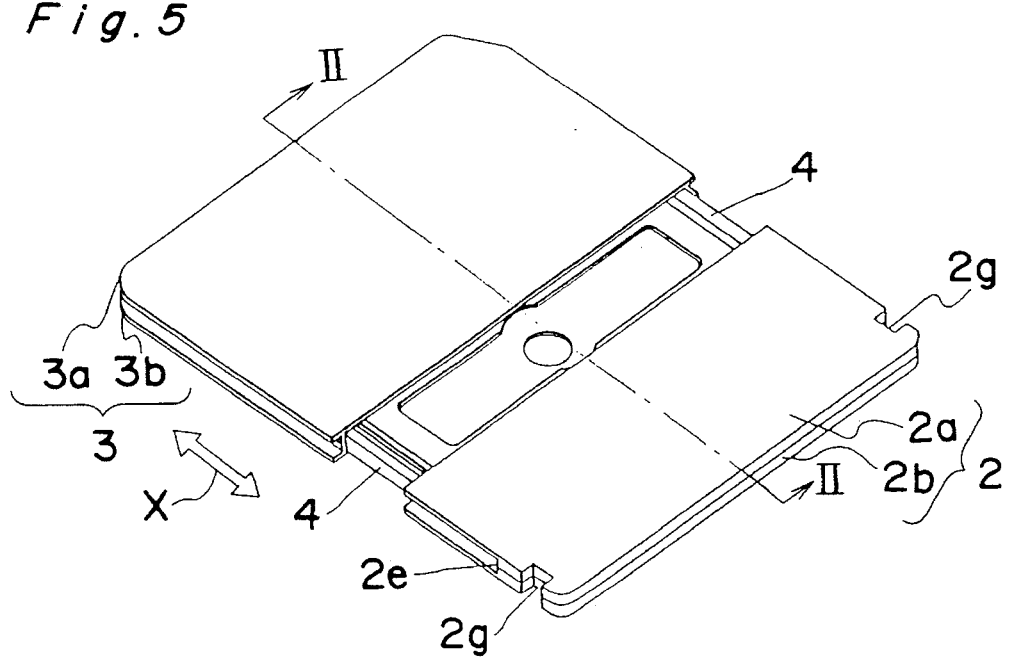
FIG. 5 is a perspective view of the first preferred embodiment of the disc cartridge according to the present invention showing the disc cartridge in an opened position.
Figure 8:
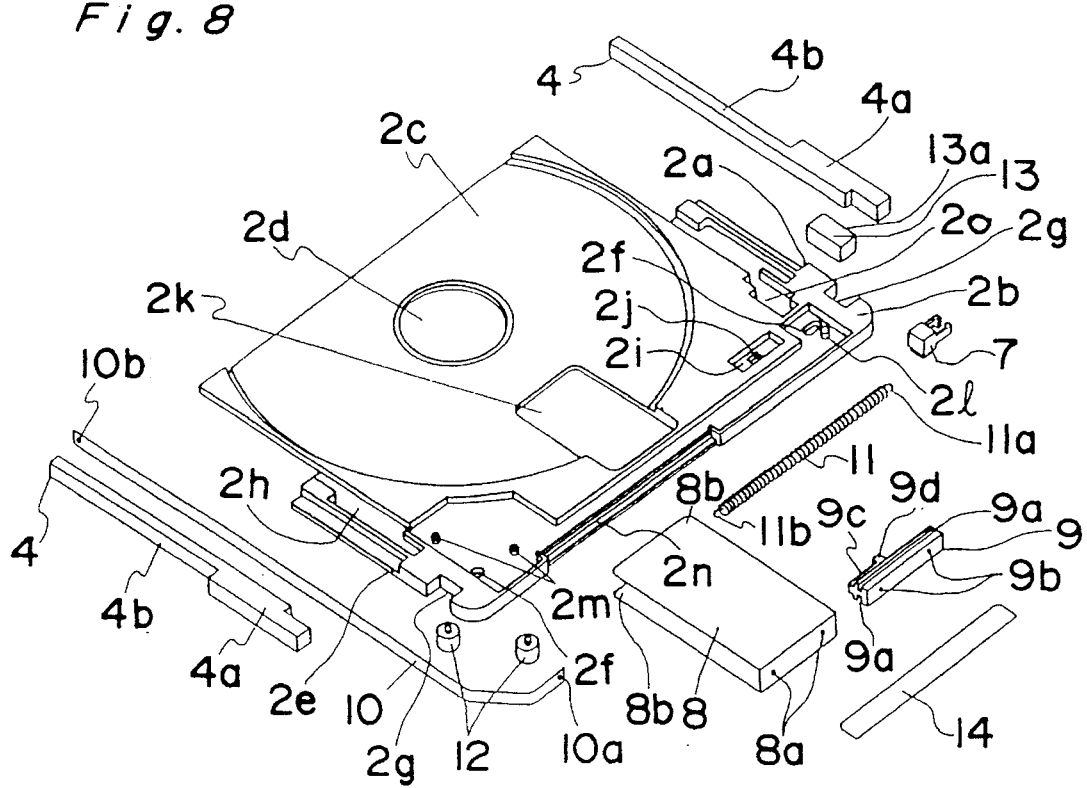
FIG. 8 is an exploded view of one of the casing halves of a second preferred embodiment of the disc cartridge according to the present invention, with the upper panels removed.
Figure 9:
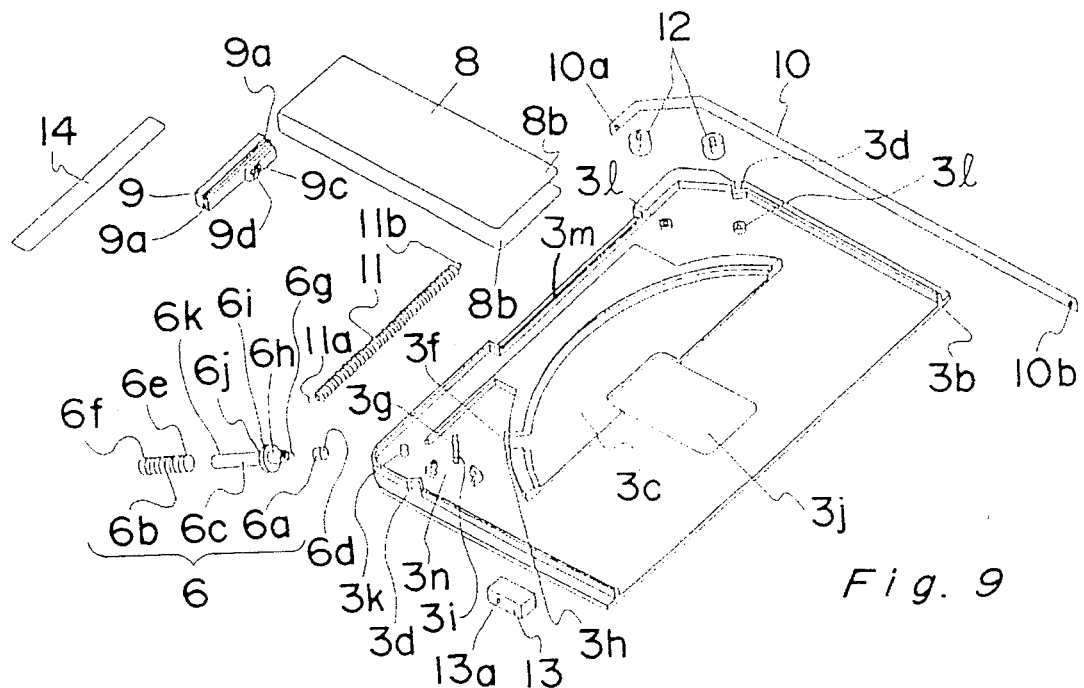
FIG. 9 is an exploded view of the other of the casing halves of the second preferred embodiment of the disc cartridge according to the present invention, with the upper panels of the respective casing halves removed.
Figure 10:
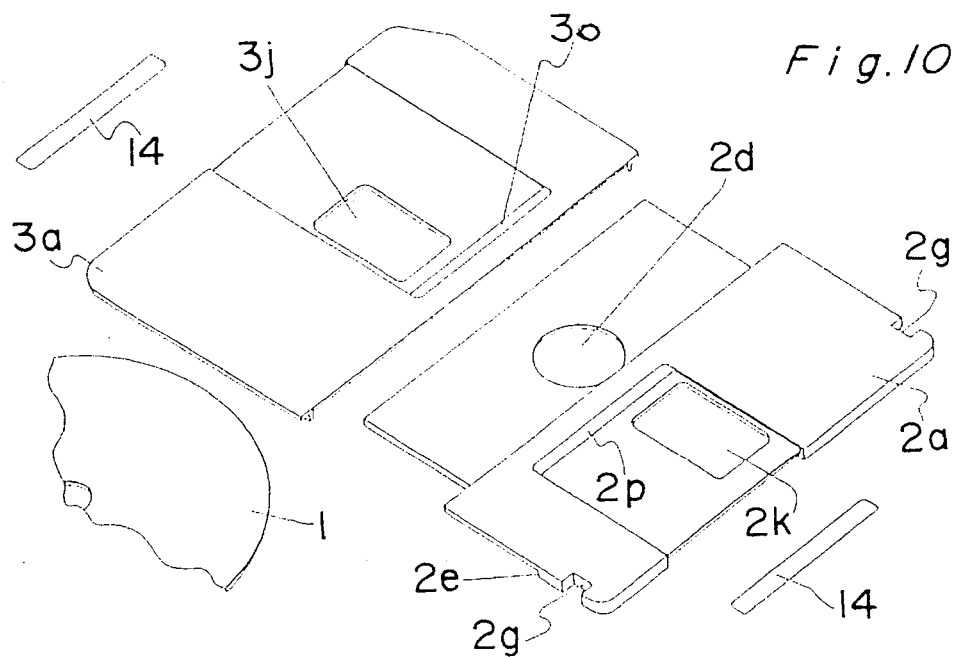
FIG. 10 is an exploded view of the second preferred embodiment of the disc cartridge according to the present invention, showing the upper panels of the respective casing halves.
Figure 11:
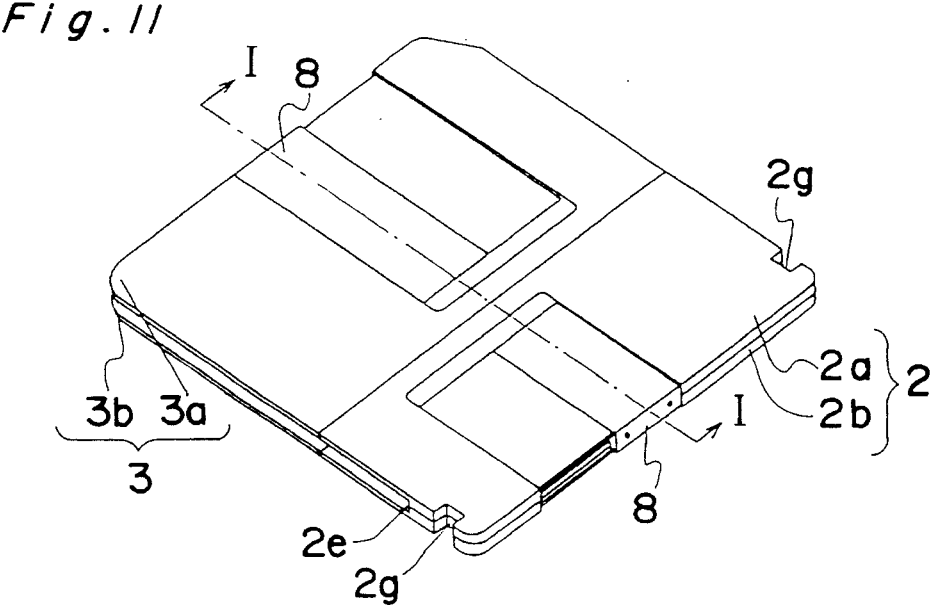
FIG. 11 is a perspective view of the second preferred embodiment of the disc cartridge according to the present invention showing the disc cartridge in the closed position.
Figure 12:
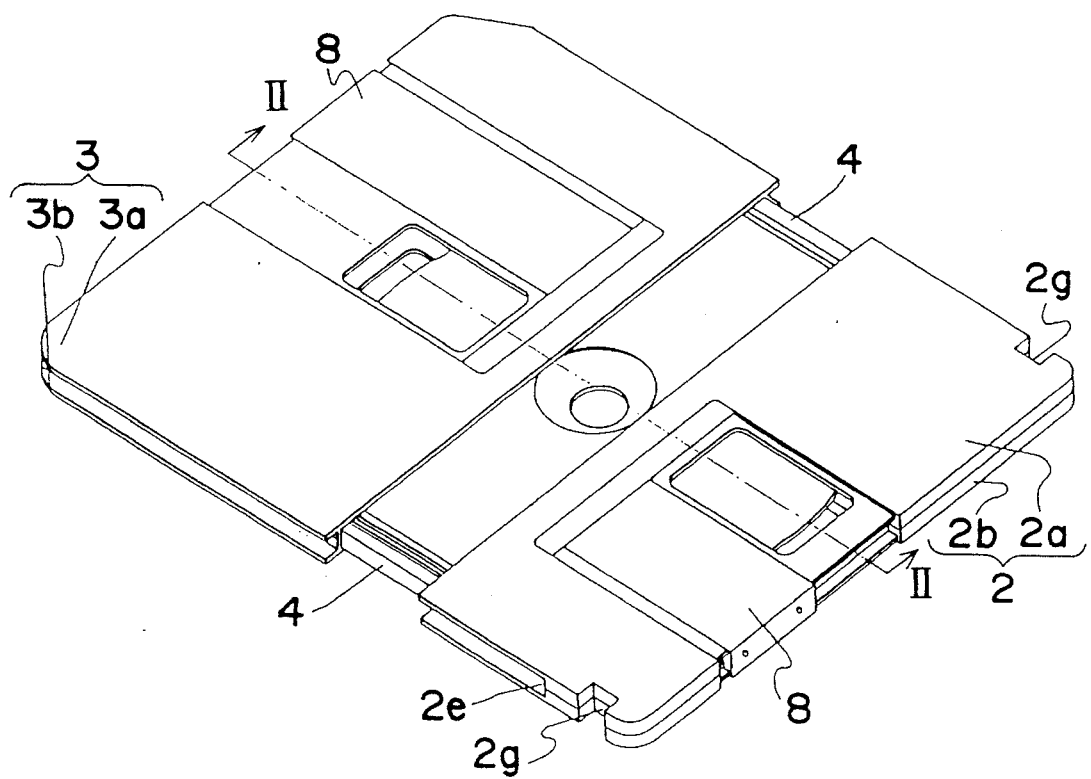
FIG. 12 is a perspective view, on an enlarged scale, of the second preferred embodiment of the disc cartridge according to the present invention showing the disc cartridge in the opened position.
Figure 15:
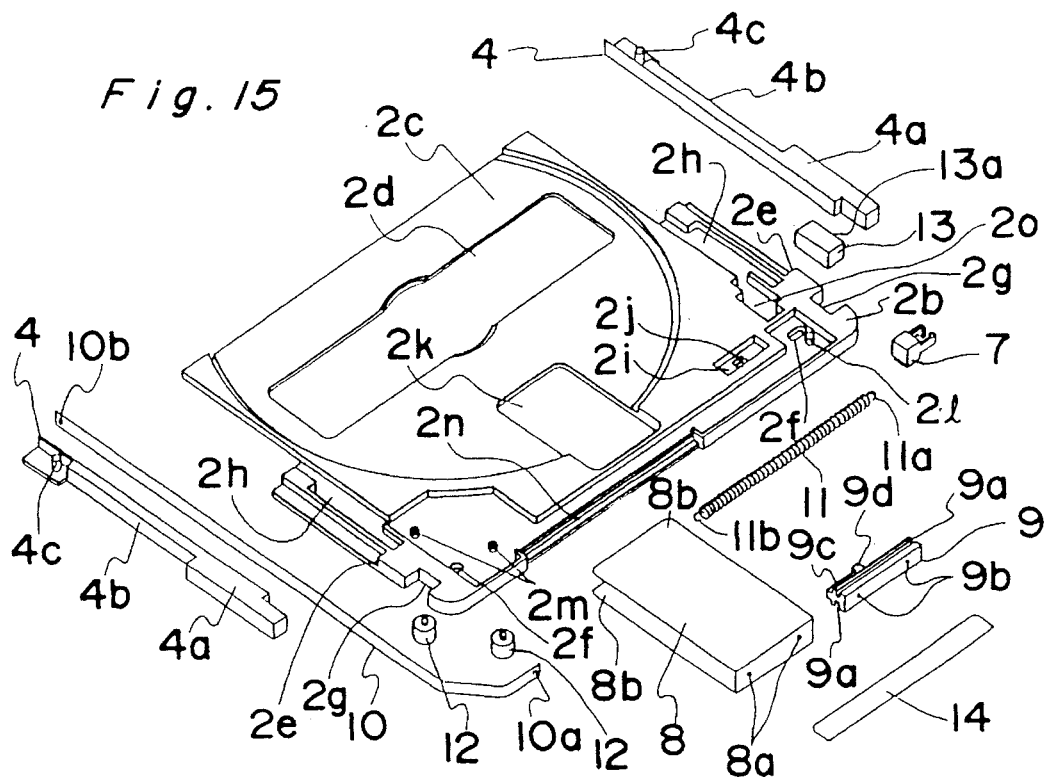
FIGS. 15 to 19 are views similar to FIGS. 8 to 12, respectively, showing a third preferred embodiment of the present invention.
Figure 16:
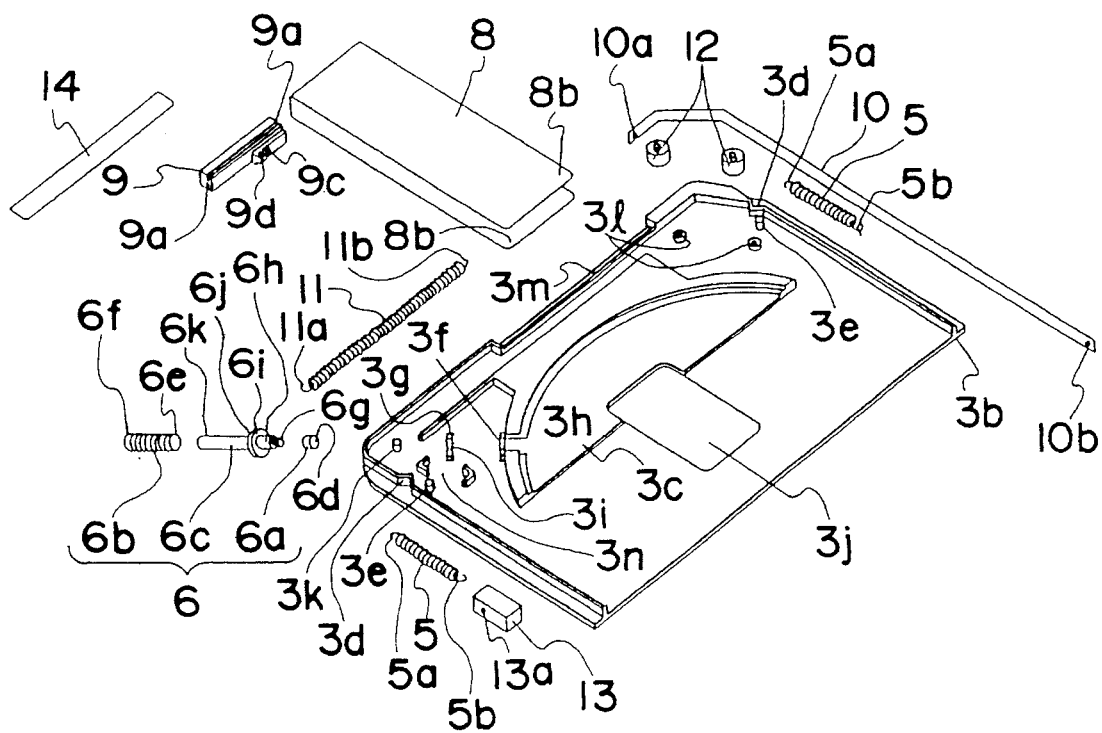
Figure 17:
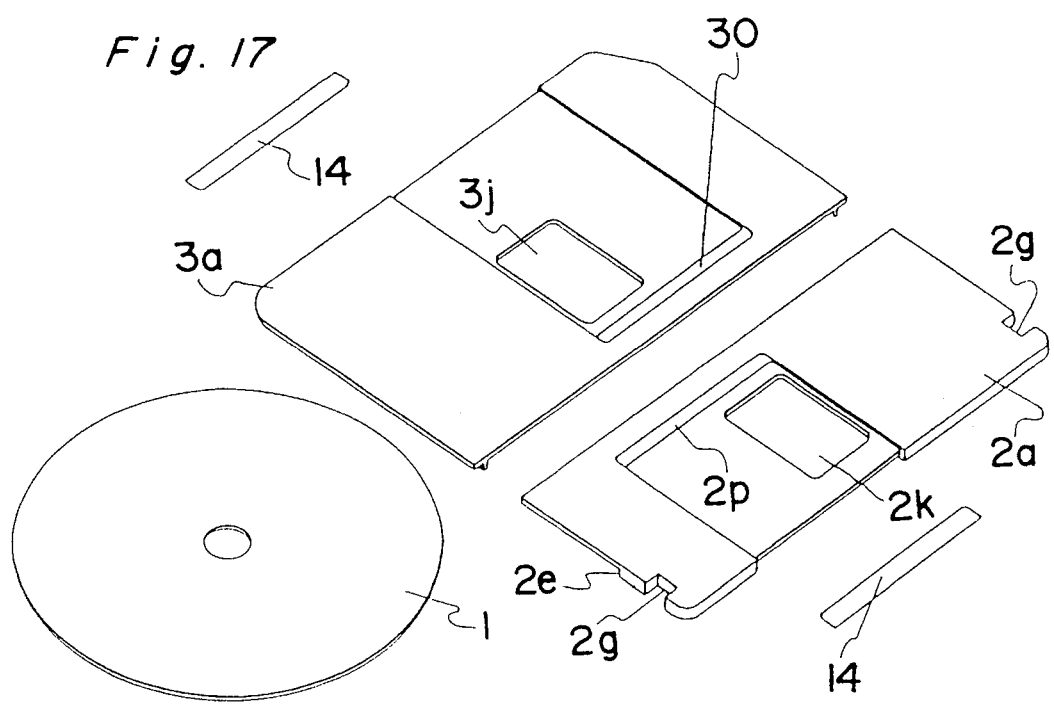

Reference numeral 2d represents a generally rectangular access opening defined in the first casing 2 with its longitudinal axis lying widthwise of the disc cartridge. This access opening 2d is adapted to permit a turntable and a clamper, both provided in the information read/write apparatus, to access the information carrier disc 1 when the disc cartridge is loaded into the information read/write apparatus and is subsequently held in the opened position. A portion of the first casing 2 where this access opening 2d is defined is, as will be described later, concealed within the second casing 3 when the disc cartridge is in the closed position as shown in FIG. 4. Reference numeral 2e represents a positioning stop provided on each side of the first casing 2 for positioning the disc cartridge at an inserted position within the cartridge loading and unloading mechanism when the disc cartridge is inserted into the apparatus through a cartridge receiving mouth (not shown).

Reference numeral 2f represents positioning holes. One of the positioning holes 2f is of a generally round shape and the other of the positioning holes 2f is of a generally rectangular shape so that, when the disc cartridge is inserted into the cartridge loading and unloading mechanism in the information read/write apparatus, the first casing 2 can be properly positioned. Reference numeral 2g represents a positioning recess 2g provided on each side of the first casing 2 for the purpose of permitting the disc cartridge to be used on an automatic cartridge stacker by which a plurality of disc cartridges can be loaded into and removed from the cartridge loading and unloading mechanism automatically one at a time. The positioning recesses 2g are allow for component parts of the automatic loading mechanism to hold the disc cartridge in the automatic cartridge stacker.

Reference numeral 2h represents a groove provided on each side of the first casing 2 for receiving a portion 4a of a respective generally elongate guide bar 4 as will be described later. Reference numeral 2i represents a recess for accommodating an erroneous erasure preventing pawl 7 for movement in a widthwise direction of the disc cartridge. Reference numeral 2j represents a detection hole. Whether the information carrier disc within the disc cartridge can be recorded can be detected depending on whether the erroneous erasure preventing pawl 3 is engaged in this detection hole 2j.

The second casing 3 similarly comprises generally rectangular upper and lower panels 3a and 3b of similar shape assembled together by the use of set screws or by the use of any known fusion-bonding technique while leaving a second cavity 3c defined therein for accommodating the rest of the information carrier disc 1. This second cavity 3c has the shape of the remaining segment of the previously mentioned circle, and is delimited by a second arcuate side wall surface 3' and a second disk holding segment 3". When the second casing 3 is retracted, the first wall surface 2' and second wall surface 3' form a circle defining a round disk chamber. It is to be noted that the first and second cavities 2c and 3c have respective steps defined therein at a position corresponding to an outer periphery of the information carrier disc and also at a position corresponding to an inner peripheral portion of the information carrier disc so that, when and so long as the disc cartridge is not in use, the information carrier disc can be supported in position within the disc chamber with non-recorded areas thereof resting on the steps.

Reference numeral 3d represents a generally V-shaped positioning indent defined on each side of the second casing 3 used to enable a chucking of the disc cartridge when the latter is loaded into the cartridge loading and unloading mechanism. Reference numeral 3e represents an engagement pin provided on each side of the second casing 3 for receiving one end 5a of a respective tension spring 5 as will be described later.

The guide bars 4 are fixedly received within the respective grooves 2h in the first casing 2 and have respective end portions 4b serving as parallel guides along which the second casing 3 slides relative to the first casing 2 in a direction conforming to the lengthwise direction of the disc cartridge. These guide bars 4 are preferably made of a synthetic resin, for example, polyacetale, of a kind having a relatively high wear resistance chosen in consideration of the material that is used for the second casing 3.

The tension springs 5 have respective opposite ends 5a and 5b and are fixed in position with the ends 5a anchored to the associated engagement pins 3e in the second casing 3 and with the ends 5b anchored to associated engagement pins 4c integral with the respective end portions 4b of the guide bars 4. These tension springs 5 serve to draw the second casing 3 close to the first casing 2 to hold the disc cartridge in the closed position when and so long as the disc cartridge is not in use as shown in FIG. 4.

Reference numeral 6 represents a generally elongate disc retainer serving as means for suppressing an arbitrary motion of the information carrier disc 1 within the disc chamber. This disc retainer 6 comprises a cap-like pad 6a, a coiled compression spring 6b and a pad holder 6c. The cap-like pad 6a is capped onto a tip 6g of the pad holder 6c and has an outer end face 6d adapted to contact the outer peripheral edge of the information carrier disc 1 to retain the latter in position within the disc chamber. Preferably, the pad 6a is made of a soft material such as, for example, butyl rubber, for the purpose of protecting the information carrier disc 1 from being damaged. The coiled compression spring 6b is mounted around a cylindrical body 6k of the pad holder 6c, having one end 6f engaged with a stopper 3i, integral with the second casing 3 and having a recess 3g defined therein, and the opposite end 6e engaged with an annular collar 6j integral with the pad holder 6c. The pad holder 6c is mounted in the second casing 3 with another cylindrical body 6h seated within a recess 3f defined in the second casing 3 and also with the cylindrical body 6k seated within the recess 3g and is axially movable, but is normally biased in a direction with the pad 6d partly protruding into the disc chamber.

The pad holder 6c is preferably made of a synthetic resin, for example, polyacetale, of a kind having a relatively high wear resistance chosen in consideration of the material that is used for the second casing 3, for facilitating an axial sliding motion of the pad holder 6c. Although the compression spring 6c serves to bias the pad holder 6 in a direction permitting the pad 6a to partly protrude into the disc chamber, the pad holder 6c is axially inwardly pressed in contact with the outer peripheral edge of the information carrier disc 1 when and so long as the information carrier disc 1 is accommodated within the disc chamber in the disc cartridge and, at the same time, the disc cartridge is held in the closed position. It is to be noted that, when the pad holder 6c is so pressed axially inwardly, an annular end face 6i of the collar 6i integral with the pad holder 6c is disengaged from an engagement face 3h of the second casing 3 with the compression spring 6c consequently compressed axially inwardly, applying a biasing force to the outer peripheral edge of the information carrier disc through the pad 6a. As a matter of course, the magnitude of the biasing force applied to the outer peripheral edge of the information carrier disc can be adjusted by suitably selecting the compression spring 6b having a required force and/or capable of being axially inwardly compressed to a required degree.

The erroneous erasure preventing pawl 7 is movably accommodated within the recess 2i in the first casing 2 and is operable to detect whether the information carrier disc 1 is recordable with information.

The first and second casings 2 and 3 are jointed together in an end-to-end abutted fashion having a thickness of 1 to 3 mm.

The disc cartridge of a construction as described hereinabove in accordance with the present invention is used in the following manner in association with the information read/write apparatus (not shown).

When the disc cartridge normally held in the closed position with the information carrier disc 1 accommodated therein is to be inserted into the cartridge receiving mouth, the user has to hold an end portion of the disc cartridge on a trailing side with respect to the direction of insertion. As the disc cartridge is inserted into the cartridge receiving mouth, the V-shaped positioning indents 3d in the second casing 3 are chucked by respective holder pins provided in the cartridge loading and unloading mechanism with the disc cartridge consequently guided towards an inserted position deep within the cartridge receiving mouth.

During the insertion of the disc cartridge and when the disc cartridge is inserted to a position adjacent respective pawls in the cartridge loading and unloading mechanism, the first casing 2 is trapped with the pawls in the cartridge loading and unloading mechanism engaged in the respective positioning stop 2e, but the second casing 3 is moved against the tension spring 5 until the access opening 2d is completely exposed to the outside of the disc cartridge. In this manner, the first and second casings 2 and 3 are separated away from each other with the disc cartridge consequently brought into the opened position.

At this time, since the information carrier disc 1 is essentially received within the first cavity 2c which is oversized relative to the second cavity 3c in the second casing 3, the information carrier disc remains within the first cavity 2c in the first casing 2 even after the disc cartridge has been brought into the opened position. On the other hand, as the first and second casings 2 and 3 are separated away from each other, the disc retainer 6 moves together with the second casing 3 then moving relative to the first casing 2 and, therefore, the pad 6a naturally disengages from the outer peripheral edge of the information carrier disc 1 thereby automatically releasing the information carrier disc. Once this happens, the information carrier disc 1 is free to rotate about its center.

Thereafter, respective positioning pins in the cartridge loading and unloading mechanism are inserted into the positioning holes 2f in the first casing 2 to hold the first casing 2 at a required position. Simultaneously or substantially simultaneously therewith, the turntable and the clamper, both provided in the information read/write apparatus, approach the access opening 2d to clamp the information carrier disc 1 in a coaxial relationship therewith in readiness for the drive of the information carrier disc 1 in one direction about the motor-coupled spindle. At the same time, two pairs of read/write heads of the information read/write apparatus access the information carrier disc 1 through the access opening 2d from opposite directions perpendicular to a plane of the information carrier disc in readiness for information reading or writing or erasure.

The removal of the disc cartridge once inserted deep into the cartridge receiving mouth from the latter will now be described.

Simultaneously with a release of the positioning of the first casing 2 using the positioning holes 2f, the information carrier disc 1 being clamped is released, allowing the turntable and the clamper to move out of and away from the access opening 2d. Then, the disc cartridge is discharged in a direction counter to the direction of insertion thereof. At this time, when the chucking of the V-shaped positioning indents 3d in the second casing 3 is released, the second casing 3 is drawn close towards the first casing 2 by the action of the pulling force of the tension springs 5 with the access opening 2d consequently becoming concealed within the second casing 3, thereby bringing the disc cartridge into the closed position. It is to be noted that, as the second casing 3 is pulled close towards the first casing 2, the disc retainer 6 fitted to the second casing 3 is axially driven by the compression spring 6c with the pad 6a brought into contact with the peripheral edge of the information carrier disc 1 to automatically retain the information carrier disc 1 in position inside the disc cartridge.

Even after the disc cartridge has been ejected from the cartridge loading and unloading mechanism of the information read/write apparatus or the storage thereof outside the information read/write apparatus, the tension springs 5 constantly pull one of the first and second casings 2 and 3 close to the other of the first and second casings 2 and 3 and, therefore, the access opening 2d is kept concealed within the second casing 3 and, at the same time, the information carrier disc 1 is retained substantially fixedly inside the disc cartridge by the action of the disc retainer 6.

Thus, in the foregoing embodiment, only one of the first and second casings 2 and 3, particularly the second casing 3, is moved close towards the other of the first and second casings 2 and 3, that is, the first casing 2, to close the disc cartridge. Therefore, the number of movable component parts necessary to permit the second casing 3 to move towards and away from the first casing 2 is considerably reduced. Also, in order to selectively open and close the disc cartridge embodying the present invention, the cartridge loading and unloading mechanism in the information read/write apparatus suffices to have the pawls serving as stoppers, making it possible to simplify the cartridge loading and unloading mechanism. Thus, the foregoing embodiment of the present invention is an improved disc cartridge of high reliability.

In addition, when the first and second casings 2 and 3 having respective joint ends of 1 to 3 mm in thickness are jointed together in an end-to-end abutted fashion when the disc cartridge is in the closed position, no gap will be formed at the joint even though one or both of the first and second casings 2 and 3 deform or warp, thereby ensuring that no foreign matter such as dust will intrude into the interior of any one of the first and second casings 2 and 3, that is, into any one of the first and second cavities 2c and 3c forming the disc chamber inside the disc cartridge. Also, no scrap of any one of the first and second casings 2 and 3 which would be formed when a shutter is employed in a disc cartridge will enter the disc chamber.

The disc cartridge of the above described construction can be utilized in an information read/write apparatus of a type employing read/write head(s) disposed on one side of the information carrier disc or on each of the opposite sides thereof. By way of example, the information read/write apparatus employing a pair of read/write heads disposed on both sides of the information carrier disc can make use of the disc cartridge of the aforementioned construction.

As compared with the information read/write apparatus operable with the prior art disc cartridge utilizing a shutter, the present invention makes it possible to reduce the size, particularly, the width and the depth, of the information read/write apparatus. In particular, the information read/write apparatus operable with the disc cartridge of the present invention can have a cartridge insertion path of a length substantially equal to that employed in the information read/write apparatus operable with the prior art disc cartridge.

Furthermore, since when the disc cartridge is loaded and positioned in the information read/write apparatus the second cavity 3c in the second casing 3 will separate away from the information carrier disc 1, all that is necessary is to accurately position only the first casing 2 and the second casing 3 need not be accurately positioned.

Moreover, the disc retainer releases the information carrier disc 1 as the first and second casings 2 and 3 are separated from each other and retains the information carrier disc 1 firmly in position inside the disc chamber automatically when the first and second casings 2 and 3 are closed together. Accordingly, the present invention merely requires the use of the disc retainer at a position distant from the information carrier disc 1 when the first and second casings 2 and 3 are separated from each other and, therefore, no connecting member is needed to associate the movement of one of the first and second casings 2 and 3 with that of the other of the first and second casings 2 and 3, thereby making it possible to reduce the number of component parts used to construct the disc cartridge.

Second Embodiment (FIGS. 8 to 14)

Referring to FIGS. 8 to 14, a generally rectangular flat disc cartridge has a width in a direction perpendicular to the direction of selective insertion or removal of the disc cartridge into or from the information read/write apparatus and also has a length in a direction conforming to the direction of selective insertion or removal of the disc cartridge and perpendicular to the widthwise direction thereof. The direction of selective insertion or removal of the disc cartridge is shown by the arrow X in FIG. 5. The disc cartridge contains therein a single-sided or double-sided information carrier disc 1 generally loosely accommodated therein for rotation about its center and comprises first and second casings 2 and 3 operatively coupled together and supported for movement relative to each other to selectively bring the disc cartridge into opened and closed positions. Each of the first and second casings 2 and 3 is made of a relatively hard synthetic resin such as, for example, ABS resin.

The first casing 2 is oversized relative to the second casing 3 and comprises generally rectangular upper and lower panels 2a and 2b of similar shape assembled together by the use of set screws or by the use of any known fusion-bonding technique while leaving a first cavity 2c defined therein for accommodating a part of the information carrier disc 1. This first cavity 2c is of a shape occupying a portion of a circle, but oversized relative to a semicircle so that a corresponding major portion of the round information carrier disc 1 can be accommodated therein.

Reference numeral 2d represents a center hole defined in the first casing 2 allowing access by the turntable of the information read/write apparatus. This center hole 2d is adapted to permit a turntable and a clamper, both provided in the information read/write apparatus, to clamp the information carrier disc 1 in position relative to a motor-coupled spindle when the disc cartridge is loaded into the information read/write apparatus and is subsequently held in the opened position. A portion of the first casing 2 where this center hole 2d is defined is, as will be described later, concealed within the second casing 3 when the disc cartridge is in the closed position as shown in FIG. 13. Reference numeral 2e represents a positioning stop provided on each side of the first casing 2 for positioning the disc cartridge at an inserted position within the cartridge loading and unloading mechanism when the disc cartridge is inserted into the apparatus through a cartridge receiving mouth (not shown).

Reference numeral 2f represents positioning holes. One of the positioning holes 2f is of a generally round shape and the other of the positioning holes 2f is of a generally rectangular shape so that, when the disc cartridge is inserted into the cartridge loading and unloading mechanism in the information read/write apparatus, the first casing 2 can be properly positioned. Reference numeral 2g represents a positioning recess provided on each side of the first casing 2 for the purpose of permitting the disc cartridge to be used on an automatic cartridge stacker by which a plurality of disc cartridges can be loaded into and removed from the cartridge loading and unloading mechanism automatically one at a time. The positioning recesses 2g allow component parts of the automatic loading mechanism to hold the disc cartridge in the automatic cartridge stacker.

Reference numeral 2h represents a groove provided on each side of the first casing 2 for receiving a portion 4a of a respective generally elongate guide bar 4 as will be described later. Reference numeral 2i represents a recess for accommodating an erroneous erasure preventing pawl 7 for movement in a widthwise direction of the disc cartridge. Reference numeral 2j represents a detection hole. Whether the information carrier disc within the disc cartridge can be recorded can be detected depending on whether the erroneous erasure preventing pawl 7 is engaged in this detection hole 2j.

Reference numeral 2l represents an anchor pin for engagement with one end 11a of a tension spring 11 as will be described later. Reference numeral 2m represents bearing holes in which respective pulleys 12 are mounted as will be described later. Reference numeral 2n represents a guide rail receivable in a guide groove 9a in a shutter guide 9 as will be described later. Reference numeral 2o represents a positioning groove in which a belt holder 13, as will be described later, is seated.

The second casing 3 similarly comprises generally rectangular upper and lower panels 3a and 3b of similar shape assembled together by the use of set screws or by the use of any known fusion-bonding technique while leaving a second cavity 3c defined therein for accommodating the rest of the information carrier disc 1. This second cavity 3c is of a shape occupying a portion of a circle, but forms a round disc chamber in cooperation with the first cavity 2c in the first casing 2. It is to be noted that the first and second cavities 2c and 3c have respective steps defined therein at a position corresponding to an outer periphery of the information carrier disc and also at a position corresponding to an inner peripheral portion of the information carrier disc so that, when and so long as the disc cartridge is not in use, the information carrier disc can be supported in position within the disc chamber with non-recorded areas thereof resting on the steps.

Reference numeral 3d represents a generally V-shaped positioning indent defined on each side of the second casing 3 used to enable a chucking of the disc cartridge when the latter is loaded into the cartridge loading and unloading mechanism. Reference numeral 3j represents an access opening defined in the second casing 3 for allowing read/write heads to access the information carrier disc 1 inside the disc cartridge. Reference numeral represents an anchor pin 3k to which one end 11a of another tension spring 11 as will be described later is engaged. Reference numeral 3l represents holes in which pulleys 12 are journalled as will be described later. Reference numeral 3m represents a guide rail adapted to be engaged in a guide recess 9a in a shutter guide 9 as will be described later. Reference numeral 3n represents a positioning portion in which a belt holder 13 as will be described later is inserted and held in position.

The guide bars 4 are fixedly placed within the respective grooves 2h in the first casing 2 with end portions 4a thereof received therein while the respective opposite end portions 4b serve as parallel guides along which the second casing 3 slides relative to the first casing 2 in a direction conforming to the lengthwise direction of the disc cartridge. These guide bars 4 are preferably made of a synthetic resin, for example, polyacetale, of a kind having a relatively high wear resistance chosen in consideration of the material that is used for the second casing 3.

Reference numeral 6 represents a generally elongate disc retainer serving as means for suppressing an arbitrary motion of the information carrier disc 1 within the disc chamber. This disc retainer 6 comprises a cap-like pad 6a, a coiled compression spring 6b and a pad holder 6c. The cap-like pad 6a is capped onto a tip 6g of the pad holder 6c and has an outer end face 6d adapted to contact the outer peripheral edge of the information carrier disc 1 to retain the latter in position within the disc chamber. Preferably, the pad 6a is made of a soft material such as, for example, butyl rubber, for the purpose of protecting the information carrier disc 1 from being damaged. The coiled compression spring 6b is mounted around a cylindrical body 6k of the pad holder 6c, having one end 6f engaged with a stopper 3i, integral with the second casing 3 and having a recess 3g defined therein, and the opposite end 6e engaged with an annular collar 6j integral with the pad holder 6c. The pad holder 6c is mounted in the second casing 3 with another cylindrical body 6h seated within a recess 3f defined in the second casing 3 and also with the cylindrical body 6k seated within the recess 3g and is axially movable, but is normally biased in a direction with the pad 6d partly protruding into the disc chamber.

The pad holder 6c is preferably made of a synthetic resin, for example, polyacetale, of a kind having a relatively high wear resistance chosen in consideration of the material that is used for the second casing 3, for facilitating an axial sliding motion of the pad holder 6c. Although the compression spring 6c serves to bias the pad holder 6 in a direction permitting the pad 6a to partly protrude into the disc chamber, the pad holder 6c is axially inwardly pressed in contact with the outer peripheral edge of the information carrier disc 1 when and so long as the information carrier disc 1 is accommodated within the disc chamber in the disc cartridge and, at the same time, the disc cartridge is held in the closed position. It is to be noted that, when the pad holder 6c is so pressed axially inwardly, an annular end face 6i of the collar 6i integral with the pad holder 6c is disengaged from an engagement face 3h of the second casing 3 with the compression spring 6c consequently compressed axially inwardly, applying a biasing force to the outer peripheral edge of the information carrier disc through the pad 6a. As a matter of course, the magnitude of the biasing force applied to the outer peripheral edge of the information carrier disc can be adjusted by suitably selecting the compression spring 6b having a required force and/or capable of being axially inwardly compressed to a required degree.

The erroneous erasure preventing pawl 7 is movably accommodated within the recess 2i in the first casing 2 and is operable to detect whether the information carrier disc 1 is recordable with information.

The shutters 8 are used to selectively open and close the access openings 2k and 3j, respectively, in the first and second casings 2 and 3. These shutters 8 have an equal width, as measured in a direction perpendicular to the direction of insertion of the disc cartridge, and also an equal thickness as measured in a direction perpendicular to a plane of rotation of the information carrier disc 1, but have different lengths as measured in a direction conforming to the direction of insertion of the disc cartridge. Specifically, the shutter 8 in the second casing 3 has a length greater than that in the first casing 2 by a quantity corresponding to the spacing between the first and second casings 2 and 3 when the disc cartridge is in the opened position.

Each of the shutters 8 has the corresponding shutter guide 9 secured thereto by means of a screw hole 9b and a hole 8a in the respective shutter 8 with the guide groove 9a receiving therein the guide rail 2n or 3m so that the respective shutter 8 can slide in a direction perpendicular to the direction of insertion of the disc cartridge. Each of the shutter guides 9 is preferably made of a synthetic resin, for example, polyacetale, of a kind having a relatively high wear resistance chosen in consideration of the material that is used for the first or second casing 2 or 3, for facilitating a sliding motion of the respective shutter.

Reference numeral 10 represents a belt provided on each side of the disc cartridge. Each of the belt has holes 10a and 10b defined at opposite ends thereof and is disposed in position with the hole 10a fixed to a screw hole 9c and with the hole 10b fixed to a screw hole 13a in the belt holder 13.

Each of the tension springs 11 has one end 11a anchored to the anchor pin 2l in the first casing 2 or the anchor pin 3k in the second casing 3 and the opposite end 11b anchored to an engagement hole 9d in the shutter guide 9. Each of these tension springs 11 is operable to bias the associated shutter 8 in a direction required to cover the access opening 2k or 3j in the first or second casing 2 or 3, respectively.

The pulleys 12 provided in each of the first and second casings 2 and 3 journalled in bearing holes 2m or 3l in the first or second casings 2 or 3, respectively for guiding the associated belt 10. Reference numeral 13 represents a belt holder provided on each of the first and second casings 2 and 3 and received in the positioning groove 2o or 3n in the first or second casing 2 or 3. Reference numeral 14 represents a shutter retainer bonded by the use of a bonding agent to a step 2p in the first casing 2 or a step 3o in the second casing 3 for avoiding any possible float of the associated shutter 8 which would otherwise occur in a direction perpendicular to a plane of the disc cartridge.

The first and second casings 2 and 3 are jointed together in an end-to-end abutted fashion having a thickness of 1 to 3 mm.

The disc cartridge of a construction as described hereinabove in accordance with the present invention is used in the following manner in association with the information read/write apparatus (not shown).

When the disc cartridge normally held in the closed position with the information carrier disc 1 accommodated therein is to be inserted into the cartridge receiving mouth, the user has to hold an end portion of the disc cartridge on a trailing side with respect to the direction of insertion. As the disc cartridge is inserted into the cartridge receiving mouth, the V-shaped positioning indents 3d in the second casing 3 are chucked by respective holder pins provided in the cartridge loading and unloading mechanism with the disc cartridge consequently guided towards an inserted position deep within the cartridge receiving mouth.

During the insertion of the disc cartridge and when the disc cartridge is inserted to a position adjacent respective pawls in the cartridge loading and unloading mechanism, the first casing 2 is trapped with the pawls in the cartridge loading and unloading mechanism engaged in the respective positioning stop 2e, but the second casing 3 is moved against the tension springs 11 until the center hole 2d is completely exposed to the outside of the disc cartridge. In this manner, the first and second casings 2 and 3 are separated away from each other with the disc cartridge consequently brought into the opened position.

Simultaneously with the separation of the first and second casings 2 and 3 away from each other, the tension springs 11 are pulled axially outwardly by the respective belts 10, causing the shutters 8 to move to open the access openings 2k and 3j. At this time, since the information carrier disc 1 is essentially received within the first cavity 2c which is oversized relative to the second cavity 3c in the second casing 3, the information carrier disc remains within the first cavity 2c in the first casing 2 even after the disc cartridge has been brought into the opened position. On the other hand, as the first and second casings 2 and 3 are separated away from each other, the disc retainer 6 moves together with the second casing 3 then moving relative to the first casing 2 and, therefore, the pad 6a naturally disengages from the outer peripheral edge of the information carrier disc 1 thereby automatically releasing the information carrier disc. Once this happens, the information carrier disc 1 is free to rotate about its center.

Thereafter, respective positioning pins in the cartridge loading and unloading mechanism are inserted into the positioning holes 2f in the first casing 2 to hold the first casing 2 at a required position. Simultaneously or substantially simultaneously therewith, the turntable and the clamper, both provided in the information read/write apparatus, approach the center hole 2d to clamp the information carrier disc 1 in coaxial relationship therewith in readiness for the drive of the information carrier disc 1 in one direction about the motor-coupled spindle. At the same time, two pairs of read/write heads of the information read/write apparatus access the information carrier disc 1 through the access openings 2k and 3j from opposite directions perpendicular to a plane of the information carrier disc in readiness for information reading or writing or erasure.

The removal of the disc cartridge once inserted deep into the cartridge receiving mouth from the latter will now be described.

Simultaneously with release of the positioning of the first casing 2 using the positioning holes 2f, the information carrier disc 1 being clamped is released, allowing the turntable and the clamper to move out of and away from the access openings 2k and 3j. Then, the disc cartridge is discharged in a direction counter to the direction of insertion thereof. At this time, when the chucking of the V-shaped positioning indents 3d in the second casing 3 is released, the second casing 3 is drawn close towards the first casing 2 by the action of the pulling force of the tension springs 11 with the center hole 2d consequently becoming concealed within the second casing 3, thereby bringing the disc cartridge into the closed position. Simultaneously therewith, the tension springs 11 are restored to their original states by means of the belts 10, causing the shutters 8 to move in a direction required to close the access openings 2k and 3j completely, respectively. It is to be noted that, as the second casing 3 is pulled close towards the first casing 2, the disc retainer 6 fitted to the second casing 3 is axially driven by the compression spring 6c with the pad 6a being brought into contact with the peripheral edge of the information carrier disc 1 to automatically retain the information carrier disc 1 in position inside the disc cartridge.

Even after the disc cartridge has been ejected from the cartridge loading and unloading mechanism in the information read/write apparatus or the storage thereof outside the information read/write apparatus, the tension springs 11 constantly pull one of the first and second casings 2 and 3 close to the other of the first and second casings 2 and 3 and, therefore, the center hole 2d and the access openings 2k and 3j are kept concealed and, at the same time, the information carrier disc 1 is retained substantially fixedly inside the disc cartridge by the action of the disc retainer 6.

Thus, in the foregoing embodiment, only one of the first and second casings 2 and 3, particularly the second casing 3, is moved close towards the other of the first and second casings 2 and 3, that is, the first casing 2, to close the disc cartridge. Therefore, the number of movable component parts necessary to permit the second casing 3 to move towards and away from the first casing 2 is considerably reduced. Also, in order to selectively open and close the disc cartridge embodying the present invention, the cartridge loading and unloading mechanism in the information read/write apparatus suffices to have the pawls serving as stoppers, making it possible to simplify the cartridge loading and unloading mechanism. Thus, the foregoing embodiment of the present invention is improved disc cartridge of high reliability.

Since the access openings 2k and 3j are automatically selectively opened and closed with the associated shutters 8 operatively associated with the relative movement of the first and second casings 2 and 3 to selectively bring the disc cartridge into the opened and closed positions, no selective opening and closing is necessary which has hitherto been accomplished by chucking the shutters by means of, for example, pawls. Attention is called to the fact that a single motion, i.e., the relative movement of the first and second casings 2 and 3, is effective to automatically drive a plurality of shutters, that is, the shutters 8.

In addition, when the first and second casings 2 and 3 having respective joint ends of 1 to 3 mm in thickness are jointed together in an end-to-end abutted fashion when the disc cartridge is in the closed position, no gap will be formed at the joint even though one or both of the first and second casings 2 and 3 deform or warp, thereby ensuring that no foreign matter such as dust will intrude into the interior of any one of the first and second casings 2 and 3, that is, into any one of the first and second cavities 2c and 3c forming the disc chamber inside the disc cartridge. Also, no scrap of any one of the first and second casings 2 and 3 which would be formed when a shutter is employed in a disc cartridge will enter the disc chamber.

The disc cartridge of the above-described construction can be utilized in an information read/write apparatus of a type employing one read/write head(s) disposed on one side of the information carrier disc or on each of the opposite sides thereof. By way of example, the information read/write apparatus employing a pair of read/write heads disposed on both sides of the information carrier disc can make use of the disc cartridge of the aforementioned construction.

As compared with the information read/write apparatus operable with the prior art disc cartridge utilizing a shutter, the present invention makes it possible to reduce the size, particularly, the width and the depth, of the information read/write apparatus. In particular, the information read/write apparatus operable with the disc cartridge of the present invention can have a cartridge insertion path of a length substantially equal to that employed in the information read/write apparatus operable with the prior art disc cartridge.

Furthermore, since when the disc cartridge is loaded and positioned in the information read/write apparatus the second cavity in the second casing 3 will separate away from the information carrier disc 1, all that is necessary is to accurately position only the first casing 2 and the second casing 3 need not be accurately positioned.

Moreover, the disc retainer releases the information carrier disc 1 as the first and second casings 2 and 3 are separated from each other and retains the information carrier disc 1 firmly in position inside the disc chamber automatically when the first and second casings 2 and 3 are closed together. Accordingly, the present invention merely requires the use of the disc retainer at a position distant from the information carrier disc 1 when the first and second casings 2 and 3 are separated from each other and, therefore, no connecting member is needed to associate the movement of one of the first and second casings 2 and 3 with that of the other of the first and second casings 2 and 3, thereby making it possible to reduce the number of component parts used to construct the disc cartridge.

Third Embodiment (FIGS. 15 to 21)

Referring to FIGS. 15 to 21, a generally rectangular flat disc cartridge has a width in a direction perpendicular to the direction of selective insertion or removal of the disc cartridge into or from the information read/write apparatus and also has a length in a direction conforming to the direction of selective insertion or removal of the disc cartridge and perpendicular to the widthwise direction thereof. The direction of selective insertion or removal of the disc cartridge is the same as that shown by the arrow X in FIG. 5. The disc cartridge contains therein a single-sided or double-sided information carrier disc 1 generally loosely accommodated therein for rotation about its center and comprises first and second casings 2 and 3 operatively coupled together and supported for movement relative to each other to selectively bring the disc cartridge into opened and closed positions. Each of the first and second casings 2 and 3 is made of a relatively hard synthetic resin such as, for example, ABS resin.

The first casing 2 is oversized relative to the third casing 3 and comprises generally rectangular upper and lower panels 2a and 2b of similar shape assembled together by the use of set screws or by the use of any known fusion-bonding technique while leaving a first cavity 2c defined therein for accommodating a part of the information carrier disc 1. This first cavity 2c is of a shape occupying a portion of a circle, but oversized relative to a semicircle so that a corresponding major portion of the round information carrier disc 1 can be accommodated therein.

Figure 18:
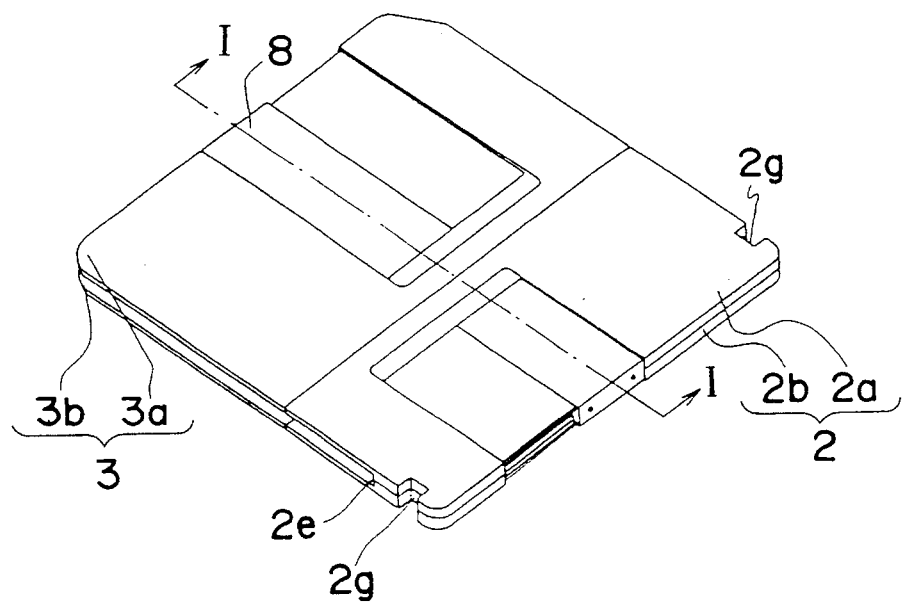
Figure 19:
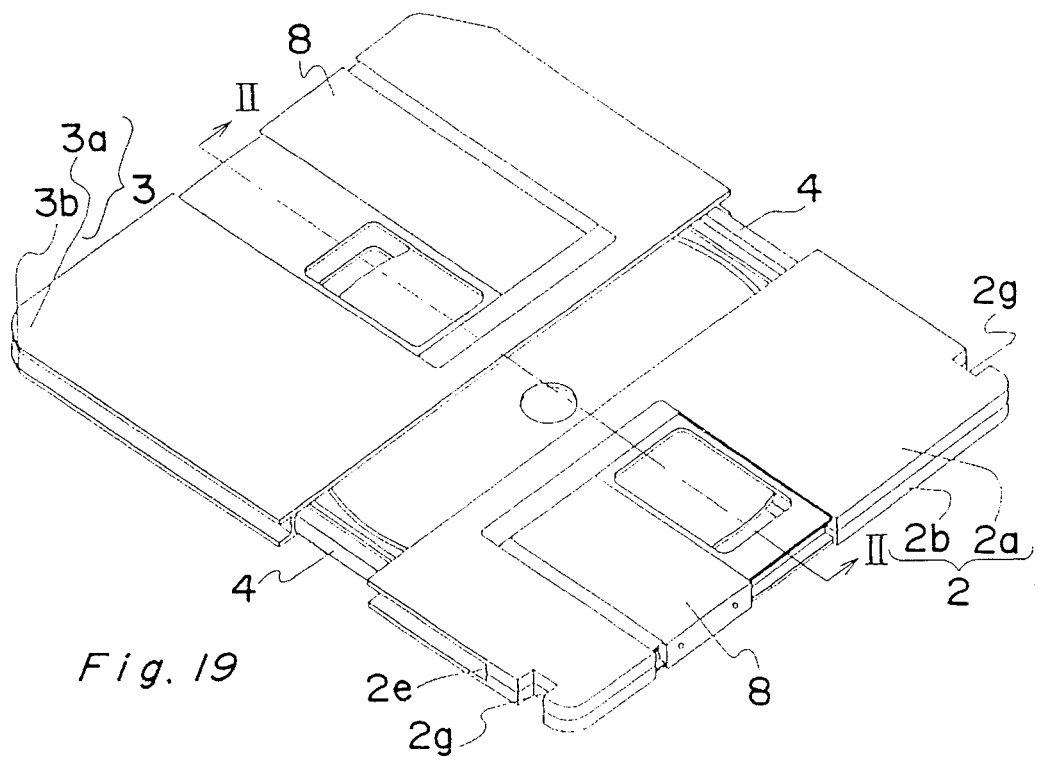
Figure 22:
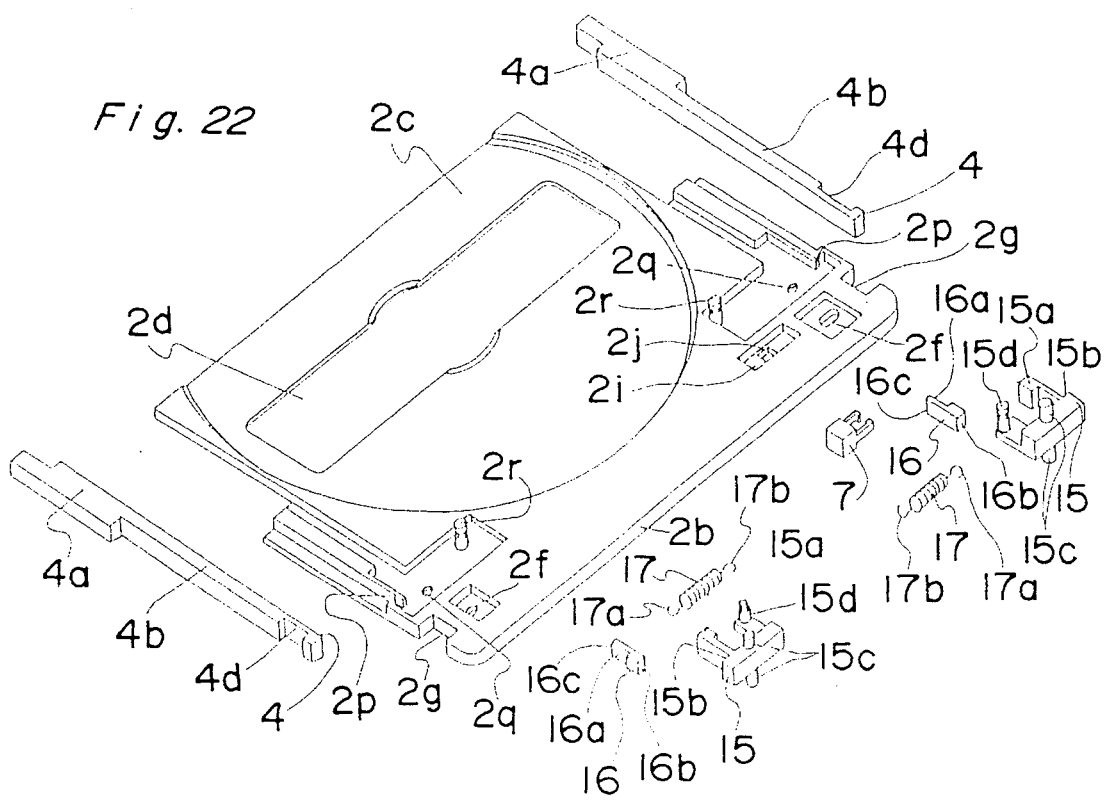
Figure 23:
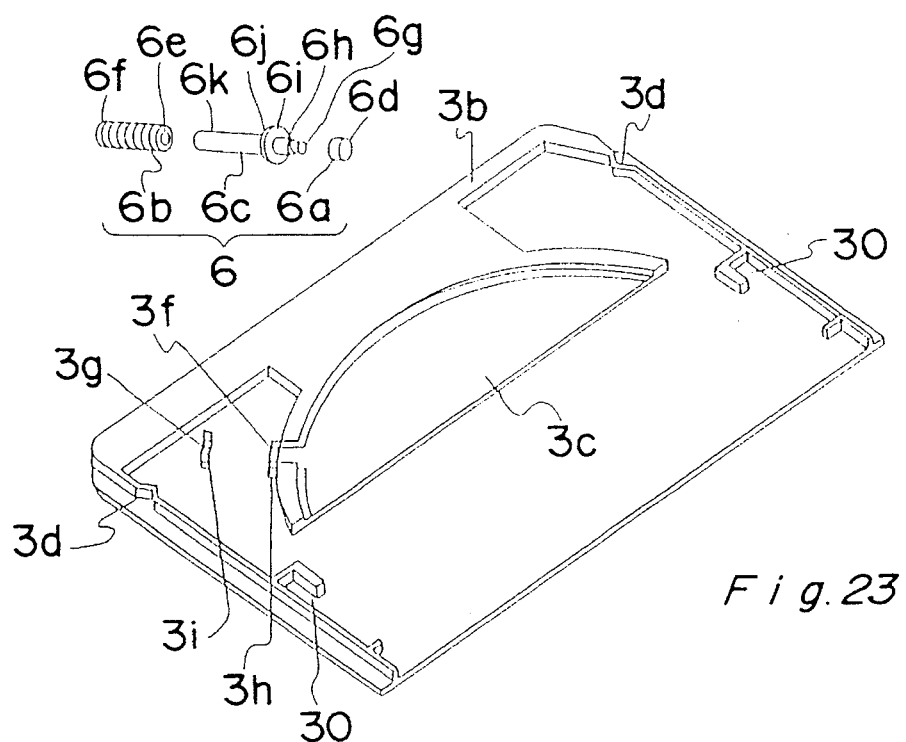
Figure 24:
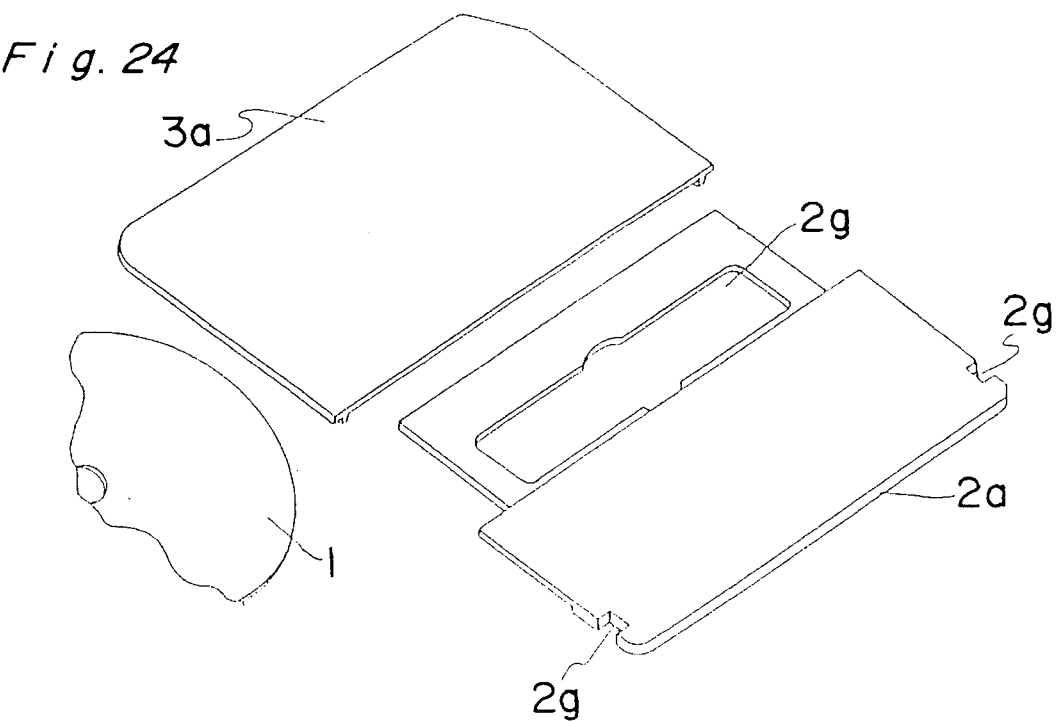
Figure 27:
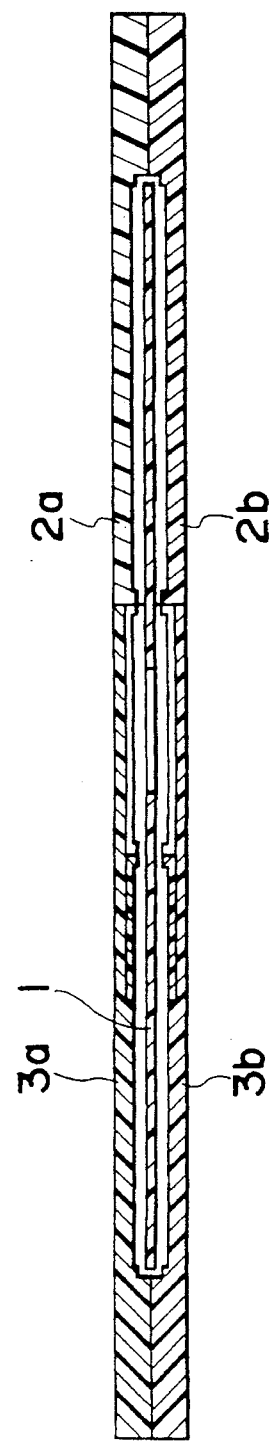
FIGS. 27 and 28 are cross-sectional views of the disc cartridge taken along the lines I—I and II—II shown in FIGS. 25 and 26.
Figure 28:
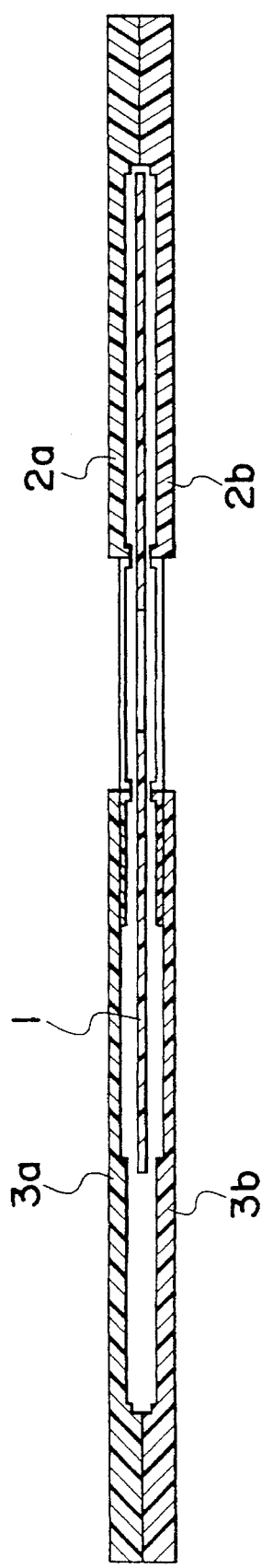

Reference numeral 2d represents a generally rectangular access opening defined in the first casing 2 for allowing access by both of the read/write heads and the turntable of the information read/write apparatus. This access opening 2d is adapted to permit a turntable and a clamper, both provided in the information read/write apparatus, to clamp the information carrier disc 1 in position relative to a motor-coupled spindle when the disc cartridge is loaded into the information read/write apparatus and is subsequently held in the opened position. A portion of the first casing 2 where this access opening 2d is defined is, as will be described later, concealed within the second casing 3 when the disc cartridge is in the closed position as shown in FIG. 18. It is to be noted that the access opening 2d in the upper panel 2a is not made in the form of a hole such as in the lower panel 2b, but is made completely open.

Reference numeral 2e represents a positioning stop provided on each side of the first casing 2 for positioning the disc cartridge at an inserted position within the cartridge loading and unloading mechanism when the disc cartridge is inserted into the apparatus through a cartridge receiving mouth (not shown). Reference numeral 2f represents positioning holes. One of the positioning holes 2f is of a generally round shape and the other of the positioning holes 2f is of a generally rectangular shape so that, when the disc cartridge is inserted into the cartridge loading and unloading mechanism in the information read/write apparatus, the first casing 2 can be properly positioned. Reference numeral 2g represents a positioning recess provided on each side of the first casing 2 for the purpose of permitting the disc cartridge to be used on an automatic cartridge stacker by which a plurality of disc cartridges can be loaded into and removed from the cartridge loading and unloading mechanism automatically one at a time. The positioning recesses 2g allow component parts of the automatic loading mechanism to hold the disc cartridge in the automatic cartridge stacker.

Reference numeral 2h represents a groove provided on each side of the first casing 2 for receiving an end portion 4a of a respective generally elongate guide bar 4 as will be described later, and reference numeral 2i represents a recess for accommodating an erroneous erasure preventing pawl 7 for movement in a widthwise direction of the disc cartridge. Reference numeral 2j represents a detection hole. Whether the information carrier disc within the disc cartridge can be recorded can be detected depending on whether the erroneous erasure preventing pawl 7 is engaged in this detection hole 2j.

Reference numeral 2k represents access openings defined in the first casing 2 for allowing access by the read/write heads. Reference numeral 2l represents an anchor pin for engagement with one end 11a of a tension spring 11 as will be described later. Reference numeral 2m represents bearing holes in which respective pulleys 12 are mounted as will be described later. Reference numeral 2n represents a guide rail receivable in a guide groove 9a in a shutter guide 9 as will be described later. Reference numeral 2o represents a positioning groove in which a belt holder 13 as will be described later is seated.

The second casing 3 similarly comprises generally rectangular upper and lower panels 3a and 3b of similar shape assembled together by the use of set screws or by the use of any known fusion-bonding technique while leaving a second cavity 3c defined therein for accommodating the rest of the information carrier disc 1. This second cavity 3c is of a shape occupying a portion of a circle, but forms a round disc chamber in cooperation with the first cavity 2c in the first casing 2. It is to be noted that the first and second cavities 2c and 3c have respective steps defined therein at a position corresponding to an outer periphery of the information carrier disc and also at a position corresponding to an inner peripheral portion of the information carrier disc so that, when and so long as the disc cartridge is not in use, the information carrier disc can be supported in position within the disc chamber with non-recorded areas thereof resting on the steps.

Reference numeral 3d represents a generally V-shaped positioning indent defined on each side of the second casing 3 used to enable a chucking of the disc cartridge when the latter is loaded into the cartridge loading and unloading mechanism. Reference numerals 3e represent anchor pins to which respective ends 5a of springs 5 are respectively anchored as will be described later. Reference numeral 3j represents an access opening defined in the second casing 3 for allowing read/write heads to access the information carrier disc 1 inside the disc cartridge. Reference numeral 3k represents an anchor pin to which one end 11a of another tension spring 11 as will be described later is engaged. Reference numeral 3l represents holes in which pulleys 12 are journalled as will be described later. Reference numeral 3m represents a guide rail adapted to be engaged in a guide recess 9a in a shutter guide 9 as will be described later. Reference numeral 3n represents a positioning portion in which a belt holder 13 as will be described later is inserted and held in position.

The guide bars 4 are fixedly placed within the respective grooves 2h in the first casing 2 with end portions 4a thereof received therein while the respective opposite end portions 4b serve as parallel guides along which the second casing 3 slides relative to the first casing 2 in a direction conforming to the lengthwise direction of the disc cartridge. These guide bars 4 are preferably made of a synthetic resin, for example, polyacetale, of a kind having a relatively high wear resistance chosen in consideration of the material that is used for the second casing 3.

The springs 5 have respective opposite ends 5a and 5b and are fixed in position with the ends 5a anchored to the associated engagement pins 3e in the second casing 3 and with the ends 5b anchored to associated engagement pins 4c integral with the respective end portions 4b of the guide bars 4. These tension springs 5 serve to draw the second casing 3 close to the first casing 2 to hold the disc cartridge in the closed position when and so long as the disc cartridge is not in use.

Reference numeral 6 represents a generally elongate disc retainer serving as means for suppressing an arbitrary motion of the information carrier disc 1 within the disc chamber. This disc retainer 6 comprises a cap-like pad 6a, a coiled compression spring 6b and a pad holder 6c. The cap-like pad 6a is capped onto a tip 6g of the pad holder 6c and has an outer end face 6d adapted to contact the outer peripheral edge of the information carrier disc 1 to retain the latter in position within the disc chamber. Preferably, the pad 6a is made of a soft material such as, for example, butyl rubber, for the purpose of protecting the information carrier disc 1 from being damaged. The coiled compression spring 6b is mounted around a cylindrical body 6k of the pad holder 6c, having one end 6f engaged with a stopper 3i, integral with the second casing 3 and having a recess 3g defined therein, and the opposite end 6e engaged with an annular collar 6j integral with the pad holder 6c. The pad holder 6c is mounted in the second casing 3 with another cylindrical body 6h seated within a recess 3f defined in the second casing 3 and also with the cylindrical body 6k seated within the recess 3g and is axially movable, but is normally biased in a direction with the pad 6d partly protruding into the disc chamber.

The pad holder 6c is preferably made of a synthetic resin, for example, polyacetale, of a kind having a relatively high wear resistance chosen in consideration of the material that is used for the second casing 3, for facilitating an axial sliding motion of the pad holder 6c. Although the compression spring 6c serves to bias the pad holder 6 in a direction permitting the pad 6a to partly protrude into the disc chamber, the pad holder 6c is axially inwardly pressed in contact with the outer peripheral edge of the information carrier disc 1 when and so long as the information carrier disc 1 is accommodated within the disc chamber in the disc cartridge and, at the same time, the disc cartridge is held in the closed position. It is to be noted that, when the pad holder 6c is so pressed axially inwardly, an annular end face 6i of the collar 6i integral with the pad holder 6c is disengaged from an engagement face 3h of the second casing 3 with the compression spring 6c consequently compressed axially inwardly, applying a biasing force to the outer peripheral edge of the information carrier disc through the pad 6a. As a matter of course, the magnitude of the biasing force applied to the outer peripheral edge of the information carrier disc can be adjusted by suitably selecting the compression spring 6b having a required force and/or capable of being axially inwardly compressed to a required degree.

The erroneous erasure preventing pawl 7 is movably accommodated within the recess 2i in the first casing 2 and is operable to detect whether the information carrier disc 1 is recordable with information.

The shutters 8 are used to selectively open and close the access openings 2k and 3j, respectively, in the first and second casings 2 and 3. These shutters 8 have an equal width, as measured in a direction perpendicular to the direction of insertion of the disc cartridge, and also an equal thickness as measured in a direction perpendicular to a plane of rotation of the information carrier disc 1, but have different lengths as measured in a direction conforming to the direction of insertion of the disc cartridge. Specifically, the shutter 8 in the second casing 3 has a length greater than that in the first casing 2 by a quantity corresponding to the spacing between the first and second casings 2 and 3 when the disc cartridge is in the opened position.

Each of the shutters 8 has the corresponding shutter guide 9 secured thereto by means of a screw hole 9b and a hole 8a in the respective shutter 8 with the guide groove 9a receiving therein the guide rail 2n or 3m so that the respective shutter 8 can slide in a direction perpendicular to the direction of insertion of the disc cartridge. Each of the shutter guides 9 is preferably made of a synthetic resin, for example, polyacetale, of a kind having a relatively high wear resistance chosen in consideration of the material that is used for the first or second casing 2 or 3, for facilitating a sliding motion of the respective shutter.

Reference numeral 10 represents a belt provided on each side of the disc cartridge. Each of the belt has holes 10a and 10b defined at opposite ends thereof and is disposed in position with the hole 10a fixed to a screw hole 9c and with the hole 10b fixed to a screw hole 13a in the belt holder 13.

Each of the tension springs 11 has one end 11a anchored to the anchor pin 2l in the first casing 2 or the anchor pin 3k in the second casing 3 and the opposite end 11b anchored to an engagement hole 9d in the shutter guide 9. Each of these tension springs 11 is operable to bias the associated shutter 8 in a direction required to cover the access opening 2k or 3j in the first or second casing 2 or 3, respectively.

The pulleys 12 provided in each of the first and second casings 2 and 3 journalled in bearing holes 2m or 3l in the first or second casings 2 or 3, respectively for guiding the associated belt 10. Reference numeral 13 represents a belt holder provided on each of the first and second casings 2 and 3 and received in the positioning groove 2o or 3n in the first or second casing 2 or 3. Reference numeral 14 represents a shutter retainer bonded by the use of a bonding agent to a step 2p in the first casing 2 or a step 3o in the second casing 3 for avoiding any possible float of the associated shutter 8 which would otherwise occur in a direction perpendicular to a plane of the disc cartridge.

The first and second casings 2 and 3 are jointed together an end-to-end abutted fashion having a thickness of 1 to 3 mm.

The disc cartridge of a construction as described hereinabove in accordance with the present invention is used in the following manner in association with the information read/write apparatus (not shown).

When the disc cartridge normally held in the closed position with the information carrier disc 1 accommodated therein is to be inserted into the cartridge receiving mouth, the user has to hold an end portion of the disc cartridge on a trailing side with respect to the direction of insertion. As the disc cartridge is inserted into the cartridge receiving mouth, the V-shaped positioning indents 3d in the second casing 3 are chucked by respective holder pins provided in the cartridge loading and unloading mechanism with the disc cartridge consequently guided towards an inserted position deep within the cartridge receiving mouth.

During the insertion of the disc cartridge and when the disc cartridge is inserted to a position adjacent respective pawls in the cartridge loading and unloading mechanism, the first casing 2 is trapped with the pawls in the cartridge loading and unloading mechanism engaged in the respective positioning stop 2e, but the second casing 3 is moved against the tension springs 5 and 11 until the access opening 2d is completely exposed to the outside of the disc cartridge. In this manner, the first and second casings 2 and 3 are separated away from each other with the disc cartridge consequently brought into the opened position.

Simultaneously with the separation of the first and second casings 2 and 3 away from each other, the tension springs 11 are pulled axially outwardly by the respective belts 10, causing the shutters 8 to move to open the access openings 2k and 3j. At this time, since the information carrier disc 1 is essentially received within the first cavity 2c which is oversized relative to the second cavity 3c in the second casing 3, the information carrier disc remains within the first cavity 2c in the first casing 2 even after the disc cartridge has been brought into the opened position. On the other hand, as the first and second casings 2 and 3 are separated away from each other, the disc retainer 6 moves together with the second casing 3 then moving relative to the first casing 2 and, therefore, the pad 6a naturally disengages from the outer peripheral edge of the information carrier disc 1 thereby automatically releasing the information carrier disc. Once this happens, the information carrier disc 1 is free to rotate about its center. The third embodiment of the present invention is so designed as to accommodate eight read/write heads.

The removal of the disc cartridge once inserted deep into the cartridge receiving mouth from the latter will now be described.

Simultaneously with release of the positioning of the first casing 2 using the positioning holes 2f, the information carrier disc 1 being clamped is released, allowing the turntable and the clamper to move out of and away from the access openings 2d and the read/write heads are moved out of the access openings 2k and 3j. Then, the disc cartridge is discharged in a direction counter to the direction of insertion thereof. At this time, when the chucking of the V-shaped positioning indents 3d in the second casing 3 is released, the second casing 3 is drawn close towards the first casing 2 by the action of the pulling forces of the tension springs 5 and 11 with the access opening 2d consequently becoming concealed within the second casing 3, thereby bringing the disc cartridge into the closed position. Simultaneously therewith, the tension springs 11 are restored to their original states by means of the belts 10, causing the shutters 8 to move in a direction required to close the access openings 2k and 3j completely, respectively. It is to be noted that, as the second casing 3 is pulled close towards the first casing 2, the disc retainer 6 fitted to the second casing 3 is axially driven by the compression spring 6c with the pad 6a being brought into contact with the peripheral edge of the information carrier disc 1 to automatically retain the information carrier disc 1 in position inside the disc cartridge.

Even after the disc cartridge has been ejected from the cartridge loading and unloading mechanism in the information read/write apparatus or the storage thereof outside the information read/write apparatus, the tension springs 5 and 11 constantly pull one of the first and second casings 2 and 3 close to the other of the first and second casings 2 and 3 and, therefore, the access opening 2d and the access openings 2d, 2k and 3j are kept concealed and, at the same time, the information carrier disc 1 is retained substantially fixedly inside the disc cartridge by the action of the disc retainer 6.

Thus, in the foregoing embodiment, only one of the first and second casings 2 and 3, particularly the second casing 3, is moved close towards the other of the first and second casings 2 and 3, that is, the first casing 2, to close the disc cartridge. Therefore, the number of movable component parts necessary to permit the second casing 3 to move towards and away from the first casing 2 is considerably reduced. Also, in order to selectively open and close the disc cartridge embodying the present invention, the cartridge loading and unloading mechanism in the information read/write apparatus suffices to have the pawls serving as stoppers, making it possible to simplify the cartridge loading and unloading mechanism. Thus, the foregoing embodiment of the present invention is an improved disc cartridge of high reliability.

According to the foregoing third embodiment of the present invention, the number of the shutters used is minimized and, also the possibility of foreign matter entering the disc cartridge and that of wear of any one of the first and second casings are minimized. In other words, since when the first and second casings 2 and 3 having respective joint ends of 1 to 3 mm in thickness are jointed together in an end-to-end abutted fashion when the disc cartridge is in the closed position, no gap will be formed at the joint even though one or both of the first and second casings 2 and 3 deform or warp, thereby ensuring that no foreign matter such as dust will intrude into the interior of any one of the first and second casings 2 and 3, that is, into any one of the first and second cavities 2c and 3c forming the disc chamber inside the disc cartridge. Also, no scrap of any one of the first and second casings 2 and 3 which would be formed when a shutter is employed in a disc cartridge will enter the disc chamber.

Also, since the access openings 2k and 3j are automatically selectively opened and closed with the associated shutters 8 operatively associated with the relative movement of the first and second casings 2 and 3 to selectively bring the disc cartridge into the opened and closed positions, no selective opening and closing is necessary which has hitherto been accomplished by chucking the shutters by means of, for example, pawls. Attention is called to the fact that a single motion, i.e., the relative movement of the first and second casings 2 and 3, is effective to automatically drive a plurality of shutters, that is, the shutters 8.

The disc cartridge of the above described construction can be utilized in an information read/write apparatus of a type employing at least one read/write heads disposed on one side of the information carrier disc or on each of the opposite sides thereof. By way of example, the information read/write apparatus employing a pair of read/write heads disposed on both sides of the information carrier disc can make use of the disc cartridge of the aforementioned construction.

As compared with the information read/write apparatus operable with the prior art disc cartridge utilizing a shutter, the present invention makes it possible to reduce the size, particularly, the width and the depth, of the information read/write apparatus. In particular, the information read/write apparatus operable with the disc cartridge of the present invention can have a cartridge insertion path of a length substantially equal to that employed in the information read/write apparatus operable with the prior art disc cartridge.

Furthermore, since when the disc cartridge is loaded and positioned in the information read/write apparatus the second cavity 3c in the second casing 3 will separate away from the information carrier disc 1, all that is necessary is to accurately position only the first casing 2 and the second casing 3 need not be accurately positioned.

Moreover, the disc retainer releases the information carrier disc 1 as the first and second casings 2 and 3 are separated from each other and retains the information carrier disc 1 firmly in position inside the disc chamber automatically when the first and second casings 2 and 3 are closed together. Accordingly, the present invention merely requires the use of the disc retainer at a position distant from the information carrier disc 1 when the first and second casings 2 and 3 are separated from each other and, therefore, no connecting member is needed to associate the movement of one of the first and second casings 2 and 3 with that of the other of the first and second casings 2 and 3, thereby making it possible to reduce the number of component parts used to construct the disc cartridge.

It is to be noted that, in the foregoing third embodiment of the present invention, the access opening 2d defined in the upper panel 2a of the first casing 2 was not made in the form of a hole. However, the access opening 2d defined in the upper panel 2a of the first casing 2 may be made in the form of a hole similar to that in the lower panel 2b shown and described in connection with the first embodiment of the present invention. Conversely, although in any one of the first and second embodiments the access opening 2d or the center hole 2d defined in the upper panel 2a of the first casing 2 has been made in the form of a hole in a manner similar to that in the lower panel 2b, the access opening in the upper panel 2a in the third embodiment of the present invention need not be made in the form of a hole and may be made completely open. In the case of a hole, the information carrier disc 1 can be supported more stably. In contrast thereto, in the case of the completely open type, the structure can advantageously be simplified and made inexpensive.

It is also to be noted that, although in the foregoing third embodiment the use of the two shutters 8 has been made, the number of the shutters need not be limited to two, but may be one or four. Also, although two pairs of the springs 5 and 11 are used, the use of one pair of the springs 5 may be dispensed with in the practice of the third embodiment of the present invention. Conversely, while in the second embodiment of the present invention only the springs 11 have been used, both springs 5 and 11 may be used. Where only the springs 11 are employed, the structure can be made simpler and inexpensive. In contrast thereto, where the springs 5 and 11 are employed, the load which would be imposed on the belts can advantageously be lessened to avoid any possible breakage of any one of the belts 10 due to fatigue.

Fourth Embodiment (FIGS. 22 to 28)

Referring now to FIGS. 22 to 28, a generally rectangular flat disc cartridge has a width in a direction perpendicular to the direction of selective insertion or removal of the disc cartridge into or from the information read/write apparatus and also has a length in a direction conforming to the direction of selective insertion or removal of the disc cartridge and perpendicular to the widthwise direction thereof. The direction of selective insertion or removal of the disc cartridge is the same as that shown by the arrow X in FIG. 5. The disc cartridge contains therein a single-sided or double-sided information carrier disc 1 generally loosely accommodated therein for rotation about its center and comprises first and second casings 2 and 3 operatively coupled together and supported for movement relative to each other to selectively bring the disc cartridge into opened and closed positions. Each of the first and second casings 2 and 3 is made of a relatively hard synthetic resin such as, for example, ABS resin.

The first casing 2 is oversized relative to the third casing 3 and comprises generally rectangular upper and lower panels 2a and 2b of similar shape assembled together by the use of set screws or by the use of any known fusion-bonding technique while leaving a first cavity 2c defined therein for accommodating a part of the information carrier disc 1. This first cavity 2c is of a shape occupying a portion of a circle, but oversized relative to a semicircle so that a corresponding major portion of the round information carrier disc 1 can be accommodated therein.

Reference numeral 2d represents a generally rectangular access opening defined in the first casing 2 with its longitudinal axis lying widthwise of the disc cartridge. This access opening 2d is adapted to permit a turntable and a clamper, both provided in the information read/write apparatus, to access the information carrier disc 1 when the disc cartridge is loaded into the information read/write apparatus and is subsequently held in the opened position. A portion of the first casing 2 where this access opening 2d is defined is, as will be described later, concealed within the second casing 3 when the disc cartridge is in the closed position as shown in FIG. 4.

Reference numeral 2f represents positioning holes. One of the positioning holes 2f is of a generally round shape and the other of the positioning holes 2f is of a generally rectangular shape so that, when the disc cartridge is inserted into the cartridge loading and unloading mechanism in the information read/write apparatus, the first casing 2 can be properly positioned. Reference numeral 2g represents a positioning recess provided on each side of the first casing 2 for the purpose of permitting the disc cartridge to be used on an automatic cartridge stacker by which a plurality of disc cartridges can be loaded into and removed from the cartridge loading and unloading mechanism automatically one at a time. The positioning recesses 2g allow component parts of the automatic loading mechanism to hold the disc cartridge in the automatic cartridge stacker.

Reference numeral 2i represents a recess for accommodating an erroneous erasure preventing pawl 7 for movement in a widthwise direction of the disc cartridge. Reference numeral 2j represents a detection hole. Whether the information carrier disc within the disc cartridge can be recorded can be detected depending on whether the erroneous erasure preventing pawl 7 is engaged in this detection hole 2j.

Reference numeral 2p represents a slit defined on each side of the first casing 2 for receiving a portion 16a of a corresponding lock release member 16 as will be described. Reference numeral 2q represents a hole defined on each side of the first casing 2 for receiving a stud portion 15c of a corresponding locking pawl 15 as will be described later, and reference numeral 2r represents a stud shaft formed on each side of the first casing 2 for receiving an end 17b of a corresponding spring (biasing member) 17 as will be described later.

The second casing 3 similarly comprises generally rectangular upper and lower panels 3a and 3b of similar shape assembled together by the use of set screws or by the use of any known fusion-bonding technique while leaving a second cavity 3c defined therein for accommodating the rest of the information carrier disc 1. This second cavity 3c is of a shape occupying a portion of a circle, but forms a round disc chamber in cooperation with the first cavity 2c in the first casing 2. It is to be noted that the first and second cavities 2c and 3c have respective steps defined therein at a position corresponding to an outer periphery of the information carrier disc and also at a position corresponding to an inner peripheral portion of the information carrier disc so that, when and so long as the disc cartridge is not in use, the information carrier disc can be supported in position within the disc chamber with non-recorded areas thereof resting on the steps.

Reference numeral 3d represents a generally V-shaped positioning indent defined on each side of the second casing 3 used to enable a chucking of the disc cartridge when the latter is loaded into the cartridge loading and unloading mechanism. Reference numeral 3o represents a recess defined on each side of the second casing 3 for receiving an end portion 4a of a corresponding guide bar 4 as will be described later.

The guide bars 4 have their end portions 4a fixedly received within the respective recesses 3o in the first casing 2 and have respective end portions 4b serving as parallel guides along which the second casing 3 slides relative to the first casing 2 in a direction conforming to the lengthwise direction of the disc cartridge. These guide bars 4 are preferably made of a synthetic resin, for example, polyacetale, of a kind having a relatively high wear resistance chosen in consideration of the material that is used for the second casing 3. Each of the guide bars 4 has a lateral recess 4d defined therein in which a pawl 15a of a locking member 15 as will be described later is received.

Reference numeral 6 represents a generally elongate disc retainer serving as means for suppressing an arbitrary motion of the information carrier disc 1 within the disc chamber. This disc retainer 6 comprises a cap-like pad 6a, a coiled compression spring 6b and a pad holder 6c. The cap-like pad 6a is capped onto a tip 6g of the pad holder 6c and has an outer end face 6d adapted to contact the outer peripheral edge of the information carrier disc 1 to retain the latter in position within the disc chamber. Preferably, the pad 6a is made of a soft material such as, for example, butyl rubber, for the purpose of protecting the information carrier disc 1 from being damaged. The coiled compression spring 6b is mounted around a cylindrical body 6k of the pad holder 6c, having one end 6f engaged with a stopper 3i, integral with the second casing 3 and having a recess 3g defined therein, and the opposite end 6e engaged with an annular collar 6j integral with the pad holder 6c. The pad holder 6c is mounted in the second casing 3 with another cylindrical body 6h seated within a recess 3f defined in the second casing 3 and also with the cylindrical body 6k seated within the recess 3g and is axially movable, but is normally biased in a direction with the pad 6d partly protruding into the disc chamber.

The pad holder 6c is preferably made of a synthetic resin, for example, polyacetale, of a kind having a relatively high wear resistance chosen in consideration of the material that is used for the second casing 3, for facilitating an axial sliding motion of the pad holder 6c. Although the compression spring 6c serves to bias the pad holder 6 in a direction permitting the pad 6a to partly protrude into the disc chamber, the pad holder 6c is axially inwardly pressed in contact with the outer peripheral edge of the information carrier disc 1 when and so long as the information carrier disc 1 is accommodated within the disc chamber in the disc cartridge and, at the same time, the disc cartridge is held in the closed position. It is to be noted that, when the pad holder 6c is so pressed axially inwardly, an annular end face 6i of the collar 6i integral with the pad holder 6c is disengaged from an engagement face 3h of the second casing 3 with the compression spring 6c consequently compressed axially inwardly, applying a biasing force to the outer peripheral edge of the information carrier disc through the pad 6a. As a matter of course, the magnitude of the biasing force applied to the outer peripheral edge of the information carrier disc can be adjusted by suitably selecting the compression spring 6b having a required force and/or capable of being axially inwardly compressed to a required degree.

The erroneous erasure preventing pawl 7 is movably accommodated within the recess 2i in the first casing 2 and is operable to detect whether the information carrier disc 1 is recordable with information.

The first and second casings 2 and 3 are jointed together in an end-to-end abutted fashion having a thickness of 1 to 3 mm.

Each of the lock members 15 has opposite stud shafts 15c journalled in respective bearing holes 2q in the first casing 2 with its pawl 15a received in the recess 4d of the corresponding guide bar 4. This lock member 15 also has an engagement piece 15b formed integrally therewith and adapted to be pressed by an end face 16b of the corresponding lock release member 16. Reference numeral 15d represents an anchor pin formed integrally with each of the lock members 15, to which pin 15d is engaged an end 17a of the corresponding biasing spring 17.

Each of the lock release members 16 has a portion 16a adapted to be inserted into the corresponding slit 2p in the first casing 2 and is received in a corresponding recess defined on each side of the first casing 2 for sliding movement in a direction conforming to the direction of insertion of the disc cartridge. This lock release member 16 has opposite ends 16b and 16c, the end 16b being used to press the engagement piece 15b of the associated lock pawl 15.

Each of the biasing springs 17 has one end 17a anchored to the anchor pin 15d and the opposite end 17b anchored to the stud shaft 2r and serves to force the pawl 15a of the associated lock member 15 into the recess 4d in the corresponding guide bar 4 thereby pulling the latter in one direction. Accordingly, the lock members 15, the lock release members 16 and the biasing springs 17 constitute locking means.

The disc cartridge of a construction as described hereinabove in accordance with the fourth preferred embodiment of the present invention is used in the following manner in association with the information read/write apparatus (not shown).

When the disc cartridge normally held in the closed position with the information carrier disc 1 accommodated therein is to be inserted into the cartridge receiving mouth, the user has to hold an end portion of the disc cartridge on a trailing side with respect to the direction of insertion. As the disc cartridge is inserted into the cartridge receiving mouth to a position where the ends 16c of the respective lock release members 16 slidably accommodated within the corresponding recesses one on each side of the first casing 2 are aligned with positions of pawls employed in the cartridge loading and unloading mechanism, the lock release members 16 are slid against the springs 17 in a direction counter to the direction of insertion with the ends 16b thereof consequently engaged with the engagement pieces 15b of the lock members 15, causing the latter to pivot about the stud shafts 15c. When the lock members 15 pivot about the stud shafts 15c, the pawls 15a are moved out of the recesses 4d in the respective guide bars 4 thereby releasing them.

During the insertion of the disc cartridge and when the disc cartridge is inserted to a position adjacent respective pawls in the cartridge loading and unloading mechanism, the first casing 2 is trapped with the pawls in the cartridge loading and unloading mechanism, but the second casing 3 continues to move until the access opening 2d is completely exposed to the outside of the disc cartridge. In this manner, the first and second casings 2 and 3 are separated away from each other with the disc cartridge consequently brought into the opened position.

At this time, since the information carrier disc 1 is essentially received within the first cavity 2c which is oversized relative to the second cavity 3c in the second casing 3, the information carrier disc remains within the first cavity 2c in the first casing 2 even after the disc cartridge has been brought into the opened position. On the other hand, as the first and second casings 2 and 3 are separated away from each other, the disc retainer 6 moves together with the second casing 3 then moving relative to the first casing 2 and, therefore, the pad 6a naturally disengages from the outer peripheral edge of the information carrier disc 1 thereby automatically releasing the information carrier disc. Once this happens, the information carrier disc 1 is free to rotate about its center.

Thereafter, respective positioning pins in the cartridge loading and unloading mechanism are inserted into the positioning holes 2f in the first casing 2 to hold the first casing 2 at a required position. Simultaneously or substantially simultaneously therewith, the turntable and the clamper, both provided in the information read/write apparatus, approach the access opening 2d to clamp the information carrier disc 1 in coaxial relationship therewith in readiness for the drive of the information carrier disc 1 in one direction about the motor-coupled spindle. At the same time, two pairs of read/write heads of the information read/write apparatus access the information carrier disc 1 through the access opening 2d from opposite directions perpendicular to a plane of the information carrier disc in readiness for information reading or writing or erasure.

The removal of the disc cartridge once inserted deep into the cartridge receiving mouth from the latter will now be described.

Simultaneously with release of the positioning of the first casing 2 using the positioning holes 2f, the information carrier disc 1 being clamped is released, allowing the turntable and the clamper to move out of and away from the access opening 2d. Then, the disc cartridge is discharged in a direction counter to the direction of insertion thereof. At this time, the second casing 3 is moved close towards the first casing 1 to join with it to bring the disc cartridge into the closed position. A disengagement of the pawls in the cartridge loading and unloading mechanism from the ends 16c of the respective lock release members 16 results in an insertion of the lock members 15 automatically into the associated recesses in the guide bars 4 by the action of the biasing forces of the springs 17 to lock the guide bars 4 while allowing the lock release members 16 to return to the initial position. Simultaneously therewith, the access opening 2d is concealed inside the second casing 3 with the disc cartridge consequently being brought into the closed position. It is to be noted that, as the second casing 3 is pulled close towards the first casing 2, the disc retainer 6 fitted to the second casing 3 is axially driven by the compression spring 6c with the pad 6a brought into contact with the peripheral edge of the information carrier disc 1 to automatically retain the information carrier disc 1 in position inside the disc cartridge.

Even after the disc cartridge has been ejected from the cartridge loading and unloading mechanism in the information read/write apparatus or the storage thereof outside the information read/write apparatus, the first and second casings 2 and 3 are locked in the closed position by the action of the locking means with the access opening 2d kept concealed within the second casing 3 and, at the same time, the information carrier disc 1 is retained substantially fixedly inside the disc cartridge by the action of the disc retainer 6, having been protected from any finger prints and/or foreign matter.

The springs and their related component parts employed in the disc cartridge are, even when the disc cartridge is held in the opened position with the first and second casings 2 and 3 separated away from each other, concealed within one or both of the first and second casings 2 and 3. The biasing members, such as the springs used to lock the disc cartridge in the closed position, would thus provided no obstruction which would otherwise scratch or catch the user's belongings even though the disc cartridge is in the opened position with the lock having been released. The disposition of the lock release members in the recesses formed in the casings effectively prevent the user from touching and accidentally releasing the lock release members.

Since the lock pawls engageable with the guide bars are supported for pivotal movement, the disc cartridge will not be accidentally released even though the disc cartridge is subjected to impacts or vibrations. The release of the locking can readily be accomplished merely by sliding the lock release members at the time the disc cartridge is desired to be loaded into the information read/write apparatus.

Thus, in the foregoing embodiment, only one of the first and second casings 2 and 3, particularly the second casing 3, is moved close towards the other of the first and second casings 2 and 3, that is, the first casing 2, to close the disc cartridge. Therefore, the number of movable component parts necessary to permit the second casing 3 to move towards and away from the first casing 2 is considerably reduced. Also, in order to selectively open and close the disc cartridge embodying the present invention, the cartridge loading and unloading mechanism in the information read/write apparatus suffices to have the pawls serving as stoppers, making it possible to simplify the cartridge loading and unloading mechanism. Thus, the foregoing embodiment of the present invention is an improved disc cartridge of high reliability.

In addition, when the first and second casings 2 and 3 having respective joint ends of 1 to 3 mm in thickness are jointed together in an end-to-end abutted fashion when the disc cartridge is in the closed position, no gap will be formed at the joint even though one or both of the first and second casings 2 and 3 deform or warp, thereby ensuring that no foreign matter such as dust will intrude into the interior of any one of the first and second casings 2 and 3, that is, into any one of the first and second cavities 2c and 3c forming the disc chamber inside the disc cartridge. Also, no scrap of any one of the first and second casings 2 and 3 which would be formed when a shutter is employed in a disc cartridge will enter the disc chamber.

The disc cartridge of the above-described construction can be utilized in an information read/write apparatus of a type employing read/write head(s) disposed on one side of the information carrier disc or on each of the opposite sides thereof. By way of example, the information read/write apparatus employing a pair of read/write heads disposed on both sides of the information carrier disc can make use of the disc cartridge of the aforementioned construction.

As compared with the information read/write apparatus operable with the prior art disc cartridge utilizing a shutter, the present invention makes it possible to reduce the size, particularly, the width and the depth, of the information read/write apparatus. In particular, the information read/write apparatus operable with the disc cartridge of the present invention can have a cartridge insertion path of a length substantially equal to that employed in the information read/write apparatus operable with the prior art disc cartridge.

Furthermore, since when the disc cartridge is loaded and positioned in the information read/write apparatus the second cavity 3c in the second casing 3 will separate away from the information carrier disc 1, all that is necessary is to accurately position only the first casing 2 and the second casing 3 need not be accurately positioned.

Moreover, the disc retainer releases the information carrier disc 1 as the first and second casings 2 and 3 are separated from each other and retains the information carrier disc 1 firmly in position inside the disc chamber automatically when the first and second casings 2 and 3 are closed together. Accordingly, the present invention merely requires the use of the disc retainer at a position distant from the information carrier disc 1 when the first and second casings 2 and 3 are separated from each other and, therefore, no connecting member is needed to associate the movement of one of the first and second casings 2 and 3 with that of the other of the first and second casings 2 and 3, thereby making it possible to reduce the number of component parts used to construct the disc cartridge.

It is to be noted that, in the foregoing fourth embodiment of the present invention, the closure of the first and second casings 2 and 3 is not effected automatically since no spring such as the springs 5 or 11 employed in any one of the first to third embodiments of the present invention is employed, but takes place on the side of the cartridge loading and unloading mechanism in the information read/write apparatus. However, the disc cartridge according to the fourth embodiment of the present invention may be designed to function in a manner similar to that according to any one of the first to third embodiments by the provision of the springs such as in the third embodiment so that the selective opening and closure of the first and second casings can take place automatically.

In describing the fourth embodiment of the present invention, no reference has been made to the use of the shutters such as employed in any one of the second and third embodiments. However, the disc cartridge according to this fourth embodiment may have shutters.

The biasing members 17 forming parts of the locking means in the fourth embodiment of the present invention, although having been described as constituted by the tension springs, may be employed in the form of any suitable biasing elements such as, for example, rubber springs or compression springs.

In any one of the first to fourth embodiments of the present invention, in order for the user to readily ascertain the direction of insertion of the disc cartridge relative to the information read/write apparatus, a pair of corner areas of the disc cartridge on a leading side thereof with respect to the direction of insertion, that is, a pair of corner areas of the second casing 3 remote from the first casing 2, have been shown as outwardly tapered while a pair or corner areas of the disc cartridge on a trailing side thereof with respect to the direction of insertion, that is, a pair of corner areas of the first casing 2 remote from the second casing 3 have been shown as rounded. However, the pair of the leading corner areas of the disc cartridge may have a shape similar to that of the trailing corner area thereof, and vice versa.

Also, in any one of the first to fourth embodiments of the present invention, the disc cartridge has been described as inserted into the cartridge loading and unloading mechanism with the second casing 3 oriented towards the cartridge receiving mouth. However, the disc cartridge can be configured so as to be insertable into the cartridge loading and unloading mechanism with the first casing 2 oriented towards the cartridge receiving mouth.

Again, in any one of the first to fourth embodiments of the present invention, the first and second casings 2 and 3 have been shown having the respective cavities 2c and 3c of an equal depth as measured in a direction perpendicular to the plane of the disc cartridge. However, the second cavity 3c in the second casing 3 may have a variety of shapes and may, for example, be so shaped and so designed as shown in FIGS. 29 to 31.

Figure 30:
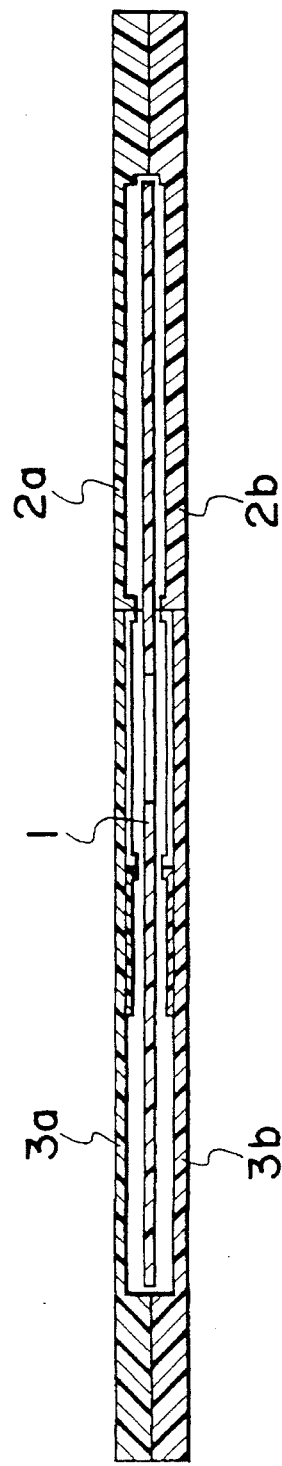
FIGS. 30 and 31 are cross-sectional views, similar to FIGS. 27 and 28, of the modified form of the fourth embodiment of the present invention.
Figure 31:
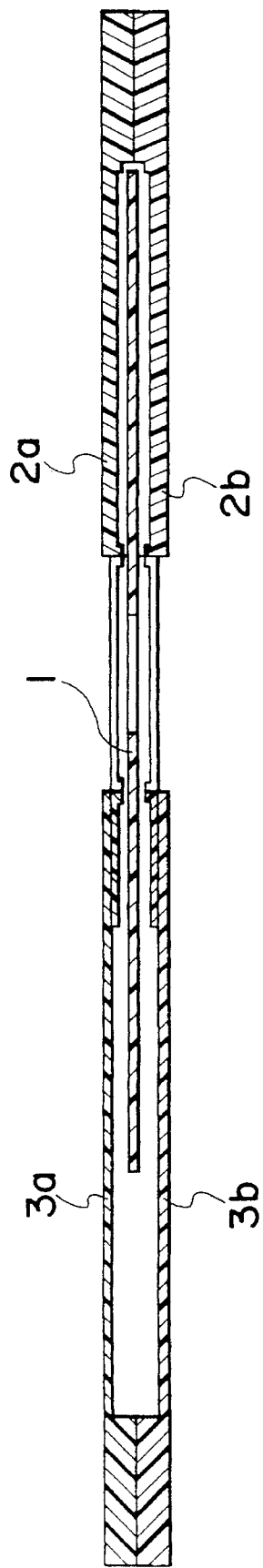

Referring now to FIGS. 29 to 31 showing a modification of the fourth embodiment of the present invention, the second cavity 3c in the second casing 3 has a depth greater than that of the first cavity 2c in the first casing 2. In this arrangement, any possible rubbing between the second casing 3 and the information carrier disc 1, which would otherwise occur during the closure of the first and second casings 2 and 3 together to bring the disc cartridge into the closed position, can advantageously be lessened. Also, the use of the second cavity 3c of a greater depth than the first cavity 2c is effective to eliminate the necessity of accurately positioning the second casing 3 relative to the cartridge loading and unloading mechanism at the time of loading the disc cartridge into the cartridge loading and unloading mechanism.

In any one of the foregoing embodiments of the present invention, the information carrier disc that can be accommodated within the disc cartridge of the present invention may be of any known disc, for example, a phase-variable optical disc, magneto-optical disc or convertible magnetic disc.

In addition, the disc cartridge shown and described in connection with any one of the foregoing embodiments of the present invention has been described as applicable to the information read/write apparatus employing a mechanical clamp system, that is, a combination of the turntable and the clamper, for holding the information carrier disc for rotation together with the motor-coupled spindle, and for this purpose, the disc cartridge has been shown having the access opening or center hole 2d defined therein for allowing access by the turntable and the clamper. However, where the disc cartridge of the present invention is desired to be applied to the apparatus employing a magnet clamp system wherein a magnet is employed to clamp the information carrier disc between it and the turntable, a portion of the upper panel which may align with the clamper, that is, a portion of the upper panel corresponding to the center of the information carrier disc, may be covered.

In any one of the first to fourth embodiments of the present invention, although the disc retainer 6 has been described as provided in the second casing 3, the disc retainer 6 may be disposed at any suitable location where it can selectively move towards and away from the information carrier disc. In addition, instead of the compression spring 6b forming a part of the disc retainer 6, any suitable biasing means such as, for example, a rubber spring may be employed.

Although the present invention has been described in connection with the preferred embodiments thereof with reference to the accompanying drawings, it is to be noted that various changes and modifications will be apparent to those skilled in the art. By way of example, the disc cartridge of the present invention is operable with any type of information read/write apparatuses operable for use with an information carrier disc.

Specifically, an information read/write apparatus has recently been developed which is provided with a plurality of heads on one or both sides of the information carrier disc and which is so designed and so structured that a transfer rate of the apparatus as a whole is increased by dividing or combining information and by recording or reproducing the divided or combined information on or from the information carrier disc, thereby effecting a digital recording or reproduction of motion pictures such as a NTSC composite signal, a component signal or a high-definition signal. An information read/write apparatus has also been developed which is provided with a plurality of heads on one or both sides of the information carrier disc so that, for example, an audio signal can be digitally recorded or reproduced independently to deal with a plurality of channels independently.

In view of the above, the disc cartridge of the present invention is equally applicable to any of those recently developed apparatuses.

Such changes and modifications are to be understood as included within the scope of the present invention as defined by the appended claims, unless they otherwise depart therefrom.

What is claimed is:

1. A disc cartridge for supporting an information carrier disc for rotation, said cartridge comprising:

a first casing having a first cavity defined therein, and an arcuate first wall surface delimiting a side of said first cavity, and a first disk holding segment which will directly face a first bottom part of the information carrier disk;

a second casing operatively coupled with said first casing so as to be movable in opposite directions relative to the first casing between extended and retracted positions to bring the disc cartridge into opened and closed positions, respectively, said first cavity having the shape of one segment of a circle having a center lying along the directions along which said second casing is movable relative to said first casing, the arcuate first wall surface delimiting the side of said first cavity being larger than a semicircle such that said first casing accommodates a major portion of the information carrier disc in said first cavity and such that the information carrier disc while directly facing the first disk holding segment is constrained by the arcuate first wall surface of said first casing to remain therewithin against forces acting on the disc in the direction in which the second casing is movable relative to said first casing as said second casing is so moved relative to said first casing to said extended position, and said second casing having a second cavity defined therein, an arcuate second wall surface delimiting a side of said second cavity, and a second disk holding segment which will directly face a second bottom part of the information carrier disk when said second disk casing is in the retracted position, said second cavity having the shape of the other remaining segment of the circle, said first arcuate wall surface of said first casing and said second arcuate wall surface of said second casing together forming said circle when said second casing is in said retracted position, whereby said second cavity will accommodate a remaining portion of the information carrier disc with the second bottom part of the information carrier disk directly facing the second disk holding segment while said second casing is in said retracted position; and at least one of said first and second casings defining an access opening which allows a turntable and at least one head of an information read/write apparatus to access the information carrier disc, said access opening being exposed to the outside when the second casing is moved relative to the first casing to the extended position.

2. A disc cartridge for supporting an information carrier disc for rotation, said cartridge comprising:

a first casing having a first cavity defined therein for accommodating a portion of the information carrier disc;

a second casing having a second cavity defined therein for accommodating a remaining portion of the information carrier disc and operatively coupled with said first casing so as to be movable relative to the first casing between extended and retracted positions to bring the disc cartridge into opened and closed positions, respectively;

at least one of said first and second casings defining an access opening of the cartridge which allows at least one head of an information read/write apparatus to access the information carrier disc; and at least one shutter, each said shutter being mounted on one of said first and second casings so as to be movable between first and second positions and operatively connected to the other of the first and second casings so as to move to the first position in response to the relative movement of the second casing to the extended position, each said shutter exposing a said access opening to the outside when in said first position.

3. The disc cartridge as claimed in claim 2, wherein said first casing has a first cavity defined therein, said first cavity having the shape of one segment of a circle having a center lying along directions along which said second casing is movable relative to said first casing, the arc delimiting said segment being larger than a semicircle such that said first casing accommodates a major portion of the information carrier disc in said first cavity and the information carrier disc is constrained by the shape of the first cavity of said first casing to remain therewithin against forces acting on the disc in the direction in which the second casing is movable relative to the first casing as said second casing is so moved relative to said first casing to said extended position, and said second cavity having the shape of the other remaining segment of the circle.

4. The disc cartridge as claimed in claim 2, and further comprising a respective belt connected at one end to each said shutter and at the opposite end to the other of the first and second casings.

5. A disc cartridge for supporting an information carrier disc for rotation, said cartridge comprising:

a first casing having a first cavity defined therein for accommodating a portion of the information carrier disc;

a second casing having a second cavity defined therein for accommodating a remaining portion of the information carrier disc and operatively coupled with said first casing so as to be movable relative to the first casing between extended and retracted positions to bring the disc cartridge into opened and closed positions, respectively;

at least one of said first and second casings defining at least one hole therein which allows a a head of an information read/write apparatus to access the information carrier disc;

at least one of said first and second casings defining an access opening therein which allows a head of an information read/write apparatus to access the information carrier disc; and at least one shutter, each said shutter being mounted on one of said first and second casings so as to be movable between first and second positions and operatively connected to the other of the first and second casings so as to move to the first position in response to the movement of the second casing to the extended position, each said shutter exposing a said access opening when in said first position, and each said hole being exposed to the outside when the second casing is moved relative to the first casing to the extended position.

6. The disc cartridge as claimed in claim 5, wherein said first casing has a first cavity defined therein, said first cavity having the shape of a segment of a circle having a center lying along directions along which said second casing is movable relative to said first casing, the arc delimiting said segment being larger than a semicircle such that said first casing accommodates a major portion of the information carrier disc in said first cavity and the information carrier disc is constrained by the shape of the first cavity of said first casing to remain therewithin against forces acting on the disc in the direction in which the second casing is movable relative to the first casing as said second casing is so moved relative to said first casing to said extended position, and said second cavity having the shape of the other remaining segment of the circle.

7. The disc cartridge as claimed in claim 5, and further comprising a respective belt connected at one end to each said shutter and at the opposite end to the other of the first and second casings.

8. A disc cartridge for supporting an information carrier disc for rotation, said cartridge comprising:

a first casing having a first cavity defined therein, an arcuate first wall surface delimiting a side of said first cavity, and a first disk holding segment which will directly face a first bottom part of the information carrier disk;

a second casing operatively coupled with said first casing so as to be movable in opposite directions relative to the first casing between extended and retracted positions to bring the disc cartridge into opened and closed positions, respectively, said first cavity having the shape of one segment of a circle having a center lying along the directions along which said second casing is movable relative to said first casing, the arcuate first wall surface delimiting the side of said first cavity being larger than a semicircle such that said first casing accommodates a major portion of the information carrier disc in said first cavity and such that the information carrier disc while directly facing the first disk holding segment is constrained by the arcuate first wall surface of said first casing to remain therewithin against forces acting on the disc in the direction in which the second casing is movable relative to the first casing as said second casing is so moved relative to said first casing to said extended position, and said second casing having a second cavity defined therein, an arcuate second wall surface delimiting a side of said second cavity, and a second disk holding segment which will directly face a second bottom part of the information carrier disk when said second disk casing is in the retracted position, said second cavity having the shape of the other remaining segment of the circle, said first arcuate wall surface of said first casing and said second arcuate wall surface of said second casing together forming said circle when said second casing is in said retracted position, whereby said second cavity will accommodate a remaining portion of the information carrier disc with the second bottom part of the information carrier disk directly facing the second disk holding segment while said second casing is in said retracted position;

a guide fixed in position on one of the first and second casings and cooperating with the other of the first and second casings to guide the second casing in its movement relative to the first casing; and a locking mechanism operatively coupled to said guide in the other of the first and second casings so as to detachably lock the second casing to the first casing.

9. The disc cartridge as claimed in claim 8, wherein said locking mechanism comprises a lock pawl disposed within and pivotally mounted to the other of the first and second casings and engageable with said guide, a biasing means for urging the lock pawl towards the guide, and a lock release member having a portion exposed to the outside of said other of the first and second casings and operable to press the lock pawl.

* * * * *